US008994547B2

(12) United States Patent
German

(10) Patent No.: US 8,994,547 B2
(45) Date of Patent: Mar. 31, 2015

(54) SYSTEMS FOR AUTOMATICALLY TRACKING PATCHING CONNECTIONS TO NETWORK DEVICES USING A SEPARATE CONTROL CHANNEL AND RELATED PATCHING EQUIPMENT AND METHODS

(75) Inventor: Michael German, Secaucus, NJ (US)

(73) Assignee: CommScope, Inc. of North Carolina, Hickory, NC (US)

( * ) Notice: Subject to any disclaimer, the term of this patent is extended or adjusted under 35 U.S.C. 154(b) by 933 days.

(21) Appl. No.: 12/545,096

(22) Filed: Aug. 21, 2009

(65) Prior Publication Data

US 2011/0043333 A1    Feb. 24, 2011

(51) Int. Cl.
*G08B 21/00*    (2006.01)
*H04Q 1/02*    (2006.01)

(52) U.S. Cl.
CPC ..................... *H04Q 1/136* (2013.01)
USPC ........ 340/687; 340/500; 340/10.1; 340/572.7

(58) Field of Classification Search
USPC ....... 340/500, 687; 365/514; 324/66; 379/25, 379/27, 326, 156; 439/489
See application file for complete search history.

(56) References Cited

U.S. PATENT DOCUMENTS

| | | | | |
|---|---|---|---|---|
| 4,491,781 A | * | 1/1985 | McClintic | 324/543 |
| 5,394,503 A | * | 2/1995 | Dietz et al. | 385/135 |
| 5,407,864 A | * | 4/1995 | Kim | 29/834 |
| 5,541,586 A | | 7/1996 | Wise | |
| 5,550,755 A | | 8/1996 | Martin et al. | |
| 5,764,043 A | | 6/1998 | Czosnowski et al. | |
| 5,854,824 A | | 12/1998 | Bengal et al. | |
| 6,002,331 A | | 12/1999 | Laor | |
| 6,175,865 B1 | | 1/2001 | Dove et al. | |
| 6,222,908 B1 | | 4/2001 | Bartolutti et al. | |

(Continued)

FOREIGN PATENT DOCUMENTS

CN    1983980 A    6/2007
CN    101142826 A    3/2008

(Continued)

OTHER PUBLICATIONS

Notification of Transmittal of the International Preliminary Report on Patentability, corresponding to International Application No. PCT/US2010/046132; Date of mailing: Dec. 1, 2011; 19 pages.

(Continued)

*Primary Examiner* — James Yang
(74) *Attorney, Agent, or Firm* — Myers Bigel Sibley & Sajovec, P.A.

(57) ABSTRACT

Methods of automatically tracking a patching connection between a first connector port of a patch panel and a second connector port of a network device are provided in which a sensor is used to detect that a first end of a patch cord has been inserted into the second connector port. The patch cord has at least one data communications channel and a separate control channel. A first conductor of the control channel of the patch cord is biased to power an integrated circuit chip on the network device. In response to the detection by the sensor, a first signal is transmitted over the separate control channel of the patch cord to the network device. A second signal is received over the control channel of the patch cord in response to the first signal. The second signal includes a unique identifier that is associated with the second connector port.

23 Claims, 15 Drawing Sheets

(56) References Cited

U.S. PATENT DOCUMENTS

| | | | |
|---|---|---|---|
| 6,285,293 B1* | 9/2001 | German et al. | ............... 340/687 |
| 6,330,307 B1 | 12/2001 | Bloch et al. | |
| 6,350,148 B1 | 2/2002 | Bartolutti et al. | |
| 6,424,710 B1 | 7/2002 | Bartolutti et al. | |
| 6,448,899 B1 | 9/2002 | Thompson | |
| 6,461,054 B1 | 10/2002 | Iwase | |
| 6,522,737 B1 | 2/2003 | Bartolutti et al. | |
| 6,688,910 B1 | 2/2004 | Macauley | |
| 6,725,177 B2 | 4/2004 | David et al. | |
| 6,871,156 B2 | 3/2005 | Wallace et al. | |
| 6,961,675 B2 | 11/2005 | David | |
| 7,028,087 B2 | 4/2006 | Caveney | |
| 7,153,142 B2 | 12/2006 | Shifris et al. | |
| 7,160,143 B2 | 1/2007 | David et al. | |
| 7,193,422 B2 | 3/2007 | Velleca et al. | |
| 7,217,152 B1 | 5/2007 | Xin et al. | |
| 7,234,944 B2 | 6/2007 | Nordin et al. | |
| 7,297,018 B2 | 11/2007 | Caveney et al. | |
| 7,370,106 B2 | 5/2008 | Caveney | |
| 7,376,734 B2 | 5/2008 | Caveney | |
| 7,468,669 B1* | 12/2008 | Beck et al. | ................. 340/572.1 |
| 7,488,206 B2 | 2/2009 | Caveney et al. | |
| 7,517,243 B2 | 4/2009 | Caveney et al. | |
| 7,519,000 B2 | 4/2009 | Caveney et al. | |
| 7,534,137 B2 | 5/2009 | Caveney et al. | |
| 7,563,102 B2 | 7/2009 | Nordin et al. | |
| 7,573,254 B2 | 8/2009 | Cobb et al. | |
| 7,613,124 B2 | 11/2009 | Caveney | |
| 7,636,050 B2 | 12/2009 | Nordin et al. | |
| 7,656,903 B2 | 2/2010 | Caveney | |
| 7,674,126 B2 | 3/2010 | Below et al. | |
| 7,717,734 B2 | 5/2010 | Caveney et al. | |
| 7,756,047 B2 | 7/2010 | Caveney | |
| 7,811,119 B2 | 10/2010 | Caveney et al. | |
| 7,841,891 B2 | 11/2010 | Caveney et al. | |
| 7,934,022 B2 | 4/2011 | Velleca et al. | |
| 7,938,700 B2 | 5/2011 | Jacks et al. | |
| 7,959,460 B2 | 6/2011 | Caveney et al. | |
| 7,969,320 B2 | 6/2011 | Nordin et al. | |
| 7,980,889 B2 | 7/2011 | Caveney et al. | |
| 8,089,976 B2 | 1/2012 | Caveney et al. | |
| 8,128,428 B2 | 3/2012 | Caveney et al. | |
| 8,246,397 B2 | 8/2012 | Jacks et al. | |
| 8,340,093 B2 | 12/2012 | Shifris et al. | |
| 8,376,787 B2 | 2/2013 | Panella et al. | |
| 8,419,465 B2 | 4/2013 | Jacks et al. | |
| 8,427,964 B2 | 4/2013 | Caveney | |
| 8,477,031 B2 | 7/2013 | McNally et al. | |
| 2002/0062985 A1* | 5/2002 | Rutledge et al. | ............ 174/128.1 |
| 2002/0117330 A1* | 8/2002 | Eldridge et al. | ............... 174/260 |
| 2003/0073343 A1 | 4/2003 | Belesimo | |
| 2005/0266719 A1* | 12/2005 | Pepe | ............................ 439/409 |
| 2006/0148279 A1 | 7/2006 | German et al. | |
| 2006/0160395 A1 | 7/2006 | Macauley et al. | |
| 2007/0117444 A1* | 5/2007 | Caveney et al. | ............... 439/404 |
| 2007/0197094 A1 | 8/2007 | Velleca | |
| 2007/0238343 A1 | 10/2007 | Velleca et al. | |
| 2007/0243725 A1 | 10/2007 | Nordin et al. | |
| 2008/0122579 A1 | 5/2008 | German et al. | |
| 2009/0096581 A1 | 4/2009 | Macauley et al. | |
| 2010/0267274 A1 | 10/2010 | McNally et al. | |
| 2013/0064249 A1 | 3/2013 | Shar et al. | |
| 2013/0095694 A1 | 4/2013 | Shifris et al. | |

FOREIGN PATENT DOCUMENTS

| | | |
|---|---|---|
| GB | 2347751 A | 9/2000 |
| GB | 2 375 898 A | 11/2002 |
| WO | WO 2009/052381 A2 | 4/2009 |
| WO | WO 2009052381 A2 * | 4/2009 |

OTHER PUBLICATIONS

Notification of Transmittal of the International Search Report and the Written Opinion of the International Searching Authority, or the Declaration; International Search Report; Written Opinion of the International Searching Authority corresponding International Application No. PCT/US2010/045988; Date of mailing: Dec. 6, 2010; 8 pages.

Notification of Transmittal of the International Search Report and the Written Opinion of the International Searching Authority, or the Declaration; International Search Report; Written Opinion of the International Searching Authority corresponding International Application No. PCT/US2010/046132; Date of mailing: Dec. 27, 2010; 10 pages.

Dallas Semiconductor Maxim, Application Note 186, "Creating Global Identifiers Using 1-Wire® Devices," Jun. 14, 2002.

Dallas Semiconductor Maxim, Application No. 148, "Guidelines for Reliable Long Line 1-Wire® Networks," Sep. 22, 2008.

Dallas Semiconductor Maxim, Application Note 1796, "Overview of 1-Wire® Technology and Its Use," Jun. 19, 2008.

1-Wire, Wikipedia, http://en.wikipedia.org/wiki/w-wire, accessed May 8, 2009.

International Preliminary Report on Patentability Corresponding to International Application No. PCT/US2010/045988; Date of Mailing: Mar. 1, 2012; 5 pages.

Patent Examination Report No. from corresponding Australian Patent Application No. 2010284185, issued Apr. 29, 2014, 4 pages.

English Translation of First Office Action, from corresponding Chinese Patent Application No. 201080048176.4, issued May 23, 2014, 2 pages.

First Office Action, from corresponding Chinese Patent Application No. 201080047733.0, issued Jun. 4, 2014, 7 pages (Chinese language only).

* cited by examiner

US 8,994,547 B2

SYSTEMS FOR AUTOMATICALLY TRACKING PATCHING CONNECTIONS TO NETWORK DEVICES USING A SEPARATE CONTROL CHANNEL AND RELATED PATCHING EQUIPMENT AND METHODS

FIELD OF THE INVENTION

The present invention relates generally to communications patching systems and, more particularly, to systems and methods for automatically tracking patching connections in communications patching systems.

BACKGROUND

Many businesses have dedicated communications systems that enable computers, servers, printers, facsimile machines and the like to communicate with each other, through a private network, and with remote locations via a telecommunications service provider. Such communications system may be hard wired through, for example, the walls and/or ceilings of the building that houses the business using communications cables. Typically, the communications cables contain eight insulated copper wires that are arranged as four differential twisted pairs of wires that may be used to transmit four separate differential signals, although in some cases fiber optic communications cables may be used instead. Individual connector ports such as RJ-45 style modular wall jacks are mounted in offices throughout the building. The communications cables provide a communications path from the connector ports in the offices to network equipment (e.g., network servers, switches, etc.) that may be located in a computer room. Communications cables from external telecommunication service providers may also terminate within the computer room.

Likewise, commercial data center operations use hard wired communications systems to interconnect hundreds or thousands of servers, routers, memory storage systems and other associated equipment. In these data centers, fiber optic communications cables and/or communications cables that include four differential pairs of insulated copper wires are used to interconnect the servers, routers, memory storage systems and the like.

In both office networks and data center operations, the communications cables that are connected to end devices may terminate into one or more communications patching systems that may simplify later connectivity changes. Typically, a communications patching system includes a plurality of "patch panels" that are mounted on one or more equipment racks. As is known to those of skill in the art, a "patch panel" refers to an inter-connection device that includes a plurality of connector ports on a front side thereof. Each connector port (e.g., an RJ-45 jack or a fiber optic adapter) is configured to receive a first communications cable that is terminated with a mating connector (e.g., an RJ-45 plug or a termination of a fiber optic cable). Typically, a second communications cable is terminated into the reverse side of each connector port. With respect to RJ-45 patch panels, the second communications cable is typically terminated into the reverse side of the patch panel by terminating the eight (or more) conductive wires of the cable into corresponding insulation displacement contacts or other wire connection terminals of the connector port. With respect to fiber optic patch panels, the second communications cable is typically terminated into the reverse side of the patch panel by inserting the termination of the second fiber optic cable into the reverse side of the fiber optic adapter. Each connector port on the patch panel may provide communications paths between the first communications cable that is plugged into the front side of the connector port and the second communications cable that is terminated into the reverse side of the connector port. The communications patching system may optionally include a variety of additional equipment such as rack managers, system managers and other devices that facilitate making and/or tracking interconnections between end devices.

FIG. 1 is a simplified example illustrating one way in which a communications patching system may be used to connect a computer (or other end device) 26 located in an office 4 of a building to network equipment 52, 54 located in a computer room 2 of the building. As shown in FIG. 1, the computer 26 is connected by a patch cord 28 to a modular wall jack 22 that is mounted in a wall plate 24 in office 4. A communications cable 20 is routed from the back end of the modular wall jack 22 through, for example, the walls and/or ceiling of the building, to the computer room 2. As there may be hundreds or thousands of wall jacks 22 within an office building, a large number of cables 20 may be routed into the computer room 2.

A first equipment rack 10 is provided in the computer room 2. A plurality of patch panels 12 are mounted on the first equipment rack 10. Each patch panel 12 includes a plurality of connector ports 16. In FIG. 1, each connector port 16 comprises a modular RJ-45 jack that is configured to receive a modular RJ-45 plug connector. However, it will be appreciated that other types of patch panels may be used such as, for example, patch panels with RJ-11 style connector ports 16 or patch panels with LC, SC, MPO or other fiber optic adapters (e.g., in data center operations).

As shown in FIG. 1, each communications cable 20 that provides connectivity between the computer room 2 and the various offices 4 in the building is terminated onto the back end of one of the connector ports 16 of one of the patch panels 12. A second equipment rack 30 is also provided in the computer room 2. A plurality of patch panels 121 that include connector ports 16' are mounted on the second equipment rack 30. A first set of patch cords 40 (only two exemplary patch cords 40 are illustrated in FIG. 1) are used to interconnect the connector ports 16 on the patch panels 12 to respective ones of the connector ports 16' on the patch panels 12'. The first and second equipment racks 10, 30 may be located in close proximity to each other (e.g., side-by-side) to simplify the routing of the patch cords 40.

As is further shown in FIG. 1, network devices such as, for example, one or more network switches 52 and network routers and/or servers 54 are mounted on a third equipment rack 50. Each of the switches 52 may include a plurality of connector ports 53. A second set of patch cords 60 connect the connector ports 53 on the switches 52 to the back end of respective ones of the connector ports 16' on the patch panels 12'. As is also shown in FIG. 1, a third set of patch cords 64 may be used to interconnect other of the connector ports 53 on the switches 52 with connector ports 55 provided on the network routers/servers 54. In order to simplify FIG. 1, only a single patch cord 60 and a single patch cord 64 are shown. One or more external communications lines 66 may be connected to, for example, one or more of the network devices 54 (either directly or through a patch panel).

The communications patching system of FIG. 1 may be used to connect each computer 26 and the like located throughout the building to the network switches 52, the network switches 52 to the network routers and servers 54, and the network routers 54 to external communications lines 66, thereby establishing the physical connectivity required to give devices 26 access to both local and wide area networks.

The equipment configuration shown in FIG. 1 in which each wall jack 22 is connected to the network equipment 52, 54 through at least two patch panels 12, 12', is referred to as a "cross-connect" communications patching system. Cross-connect patching systems are also routinely used in data center operations. In a cross-connect patching system such as the system of FIG. 1, connectivity changes are typically made by rearranging the patch cords 40 that interconnect the connector ports 16 on the patch panels 12 with respective of the connector ports 16' on the patch panels 12'.

The patch cords in communications patching systems may be rearranged frequently. The patch cord interconnections are typically logged in a computer-based log that records changes made to the patch cord connections in order to keep track of, for example, the networked computing device (i.e., the computers 26 and other equipment of FIG. 1 that are located in the offices 4) that is connected to each connector port on each switch (i.e., the network switches 52 of FIG. 1). However, technicians may neglect to update the log each and every time a change is made, and/or may make errors in logging changes. As such, the logs may not be 100 percent accurate.

A variety of systems have been proposed for automatically logging the patch cord connections in a communications patching system, including techniques that use mechanical switches, radio frequency identification and the like. Typically, these patching systems use special "intelligent" patch panels and management hardware and/or software to detect patch cord insertions and or removals and/or to read identifiers located on the patch cords to facilitate automatic tracking of the patching connections. Typically, these systems require that all of the patch panels in the communications patching field have these automatic tracking capabilities.

Another commonly used equipment configuration is known as an "inter-connect" patching system. In an inter-connect patching system, the communications path from each modular wall jack 22 to the network switches, server and routers 52, 54 typically passes through a single patch panel 12. The main advantage of such inter-connect patching systems is that they can significantly reduce the number of patch panels required in the system.

FIG. 2 depicts a simplified version of an inter-connect patching system that is used to connect a plurality of computers (and other networked computing devices) 126 located in the offices 104 throughout an office building to network equipment 152, 154 located in a computer room 102 of the building. As shown in FIG. 2, a plurality of patch panels 112 are mounted on a first equipment rack 110. Each patch panel 112 includes a plurality of connector ports 116. A plurality of communications cables 120 are routed from wall jacks 122 in the offices 104 into the computer room 102 and connected to the reverse side of respective of the connector ports 116 on the patch panels 112. The computers 126 are connected to respective of the modular wall jacks 122 by patch cords 128.

As is further shown in FIG. 2, network routers and/or servers 154 are mounted on a second equipment rack 150. One or more external communications lines 166 are connected to at least some of the network devices 154. A plurality of network switches 152 that include a plurality of connector ports 153 are also provided. The switches 152 may be connected to the network servers/routers 154 using a first set of patch cords 164 (only one patch cord 164 is shown in FIG. 2). A second set of patch cords 160 (only one patch cord 160 is shown in FIG. 2) is used to interconnect the connector ports 116 on the patch panels 112 with respective of the connector ports 153 on the network switches 152. In the inter-connect patching system of FIG. 2, connectivity changes are typically made by rearranging the patch cords 160 that interconnect the connector ports 116 on the patch panels 112 with respective of the connector ports 153 on the network switches 152.

Unfortunately, many of the known methods for automatically tracking patching connections are unsuitable for inter-connect communications patching systems because the switch manufacturers generally do not provide patch cord tracking capabilities on commercially available switches. Thus, while inter-connect communications patching systems may reduce the required number of patch panels in a communications patching system, they may also make it more difficult to track patching connections.

SUMMARY

According to certain embodiments of the present invention, methods of automatically tracking a patching connection between a first connector port of a patch panel and a second connector port of a network device such as a network switch or server are provided. Pursuant to these methods, a sensor is used to detect that a first end of a patch cord has been inserted into the first connector port. The patch cord has at least one data communications channel and a separate control channel. A first conductor of the control channel is biased with a voltage of, for example, 5 volts, to power an integrated circuit chip on the network device. A first signal is transmitted over the control channel to the network device in response to detecting that the first end of the patch cord has been inserted into the first connector port. A second signal from the integrated circuit chip is then received over the control channel in response to the first signal. This second signal includes a unique identifier that is associated with the second connector port on the network device.

In some embodiments, the first conductor of the control channel may be a signal carrying conductor and the control channel may also include a second conductor that may be a ground conductor. The first signal may transmitted over the control channel of the patch cord to a serial ID chip that is mounted on the network device and that is associated with the second connector port. This serial ID chip may, for example, be mounted on a printed circuit board that is part of a passive label that is attached to the network device. The method may further include determining that a pair of contacts that are provided on the second end of the patch cord are not short-circuited prior to transmitting the first signal over the control channel of the patch cord to the network device. The data communications channel of the patch cord may comprise, for example, at least one optical fiber or at least one differential pair of insulated conductors.

Pursuant to further embodiments of the present invention, passive electronically readable labels are provided that are configured to be installed on a network device such as a network switch or server. These labels include a printed circuit board having an integrated circuit chip and a pair of contacts that are positioned to be adjacent to a connector port on the network device. At least one of contacts of the pair of contacts is electrically connected to the integrated circuit chip via a conductive path on the printed circuit board. Moreover, a unique identifier that is associated with the connector port is stored within the integrated circuit chip. The printed circuit board is electrically isolated from the network device.

In some embodiments, the integrated circuit chip may be a serial ID chip. In such embodiments, the second contact of the pair of contacts may be electrically connected to a grounded conductor on the printed circuit board. The label may also include an adhesive layer on the back side of the printed circuit board that includes an opening that receives the serial ID chip. The serial ID chip may be powered by a voltage received through the first contact.

Pursuant to still further embodiments of the present invention, systems for automatically tracking patch cord connectivity in a communications patching system are provided. These systems include a patch panel having a local connector port and a local printed circuit board that includes a local pair of contacts and a sensor mounted adjacent the local connector port. A passive electronically readable label is also provided that includes a remote integrated circuit chip (e.g., a serially ID chip) having a unique identifier that is mounted on a remote printed circuit board. This label is configured to be mounted adjacent to a remote connector port on a network device, and the remote printed circuit includes a remote pair of contacts. The system also includes at least one patch cord having a data communications channel for carrying network communications and a separate control channel that comprises first and second insulated conductors. The local pair of contacts electrically connect the first and second insulated conductors to the local printed circuit board when a local end of the patch cord is inserted into the local connector port, and the remote pair of contacts electrically connect the first and second insulated conductors to the remote printed circuit board when a remote end of the patch cord is inserted into the remote connector port.

In some embodiments, the system may further include a local integrated circuit chip that is in communication with the local pair of contacts and that is configured to transmit a first signal through the local pair of contacts, over the control channel on the patch cord, through the remote pair of contacts to a remote serial ID chip. Moreover, the first signal may be configured to cause the serial ID chip to send a responsive second signal that includes the unique identifier of the serial ID chip to the local integrated circuit chip. The serial ID chip may draw its operating voltage from the patch cord.

Pursuant to still further embodiments of the present invention, patch cords are provided that include a communications cable that has at least one data communications channel and first and second insulated conductors that form a control channel. These patch cords include a first connector that is attached to a first end of the communications cable. This first connector includes a dielectric housing having a forward portion that is configured to mate with a connector port and a rear portion the receives the communications cable, a first contact that is electrically connected to the first insulated conductor of the control channel and a second contact that is electrically connected to the second insulated conductor of the control channel. The first and second contacts are mounted to extend forwardly from of the rear portion of the housing so as to extend above the forward portion of the housing.

DETAILED DESCRIPTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the present invention are described below with reference to flowchart illustrations. It will be understood that some blocks of the flowchart illustrations may be combined or split into multiple blocks, and that the blocks in the flow chart diagrams need not necessarily be performed in the order illustrated in the flow charts.

Pursuant to embodiments of the present invention, communications patching systems are provided which use serial ID chips to allow intelligent tracking of patching connections within the communications patching system. These serial ID chips may be mounted on patch panels and may also be attached to network switches, routers, servers, mainframe computers, blade servers, network storage devices, private branch exchanges ("PBX"), uninterruptible power supplies ("UPS"), managed power distribution units ("PDU") and the like that include connector ports. As such, the communications patching systems according to embodiments of the present invention may allow for intelligent tracking of patching connections in both cross-connect and in inter-connect communications patching systems.

Figure 3:
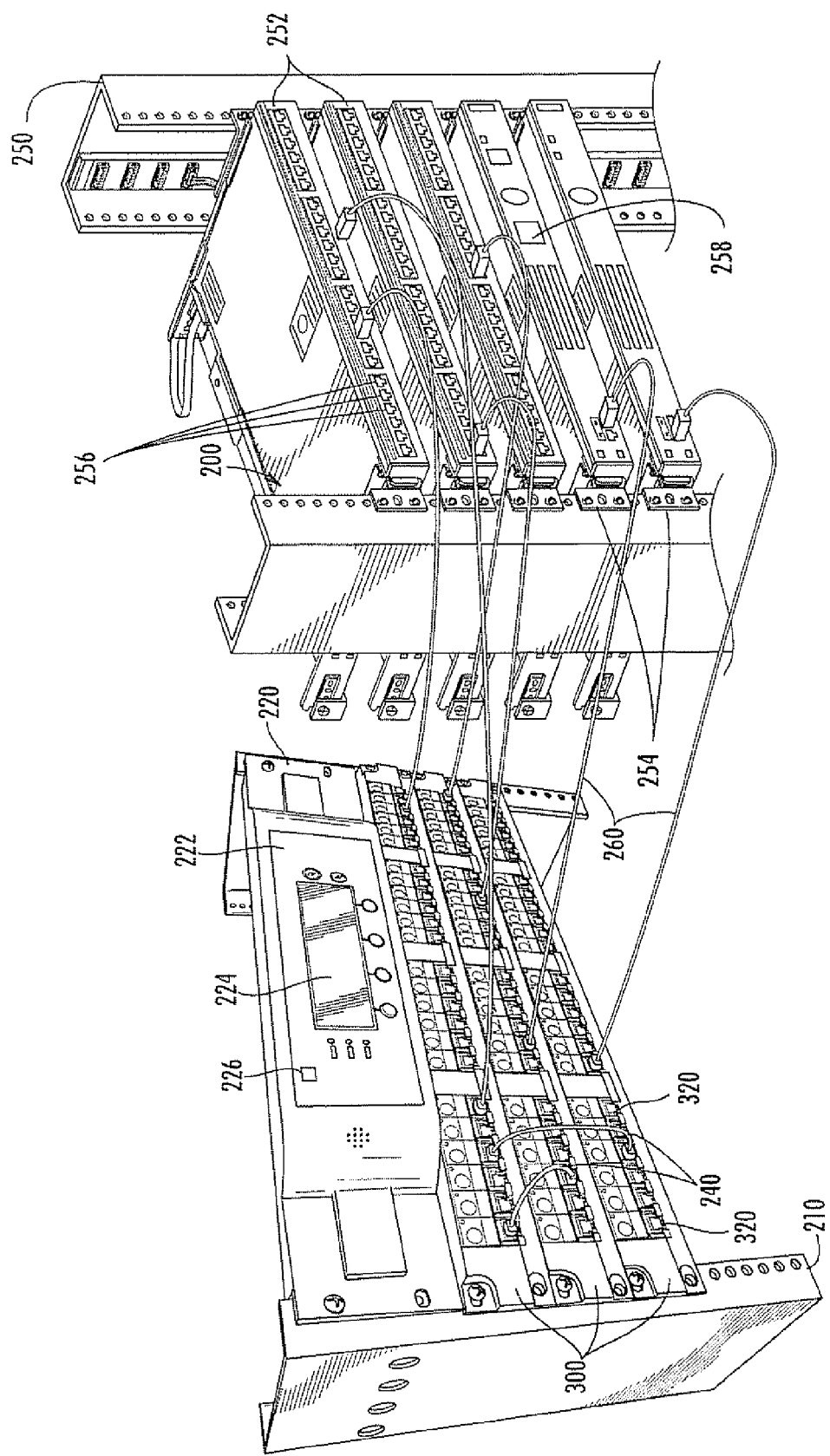
FIG. 3 is a schematic diagram depicting a communications patching system according to certain embodiments of the present invention.

FIG. 3 is a schematic diagram depicting an exemplary communications patching system 200 according to certain embodiments of the present invention. The communications patching system 200 includes components, discussed in more detail herein, that can be used to automatically track the patch cord connectivity within the communications patching system 200. As shown in FIG. 3, the exemplary communications system 200 includes a plurality of intelligent patch panels 300 having connector ports 320 that are mounted on a first equipment rack 210 in parallel horizontal rows. A cable may be attached to the reverse side of each connector port 320 to electrically connect each connector port 320 to end devices (to simplify the drawing, these cables are omitted in FIG. 3). The communications system 200 further includes a plurality of network devices 252, 254 (e.g., switches, routers, servers, mainframe computers, network storage devices, PBXs, UPSs, managed PDUs or the like) that are mounted on a second equipment rack 250. The network switches 252 may include a plurality of closely spaced connector ports 256, while the other network devices (which are depicted as network servers 254 in FIG. 3) typically include a smaller number of connector ports 258. The communications patching system 200 also includes a plurality of patch cords 260 which are each used to connect a respective one of the connector ports 320 on the patch panels 300 to a respective ones of the connector ports 256, 258 on the network devices 252, 254. While four such patch cords 260 are depicted in FIG. 3, it will be appreciated that typically many more patch cords 260 would be used. The first and second equipment racks 210, 250 may be located in close proximity to each other (e.g., side-by-side) to simplify the routing of the patch cords 260.

A rack controller 220 is also mounted on the equipment rack 210. The rack controller 220 includes a central processing unit ("CPU") 222 and a display 224. In larger communications patching systems that include multiple patch panel equipment racks (only a single such rack 210 is depicted in FIG. 3), the rack controller 220 may be interconnected with rack controllers (not shown in FIG. 3) that are provided on the other patch panel equipment racks (not shown in FIG. 3) so that the rack controllers 220 can communicate in a common network as if they were a single controller. The CPU 222 may be capable of independently running line tracing programs and may also include a remote access port 226 that enables the CPU 222 to be accessed by a remote computer such as, for example, a system administrator computer (not shown in FIG. 3). The rack controller 220 may, for example, operate and gather data from intelligent tracking capabilities of the patch panels 300, as will be later explained.

The patching connections between the connector ports 320 on the patch panels 300 to respective ones of the connector ports 256, 258 on the network devices 252, 254 are the type of patching connectivity used in inter-connect style communications patching systems. However, as discussed in more detail below, the capabilities for automatically tracking patching connections that are disclosed herein can also be used in cross-connect patching systems. In order to facilitate discussion as to how embodiments of the present invention may be used to track patching connections in cross-connect patching systems, two additional patch cords 240 are illustrated in FIG. 3 that provide patching connections between connector ports 320 on two of the intelligent patch panels 300.

Figure 4:
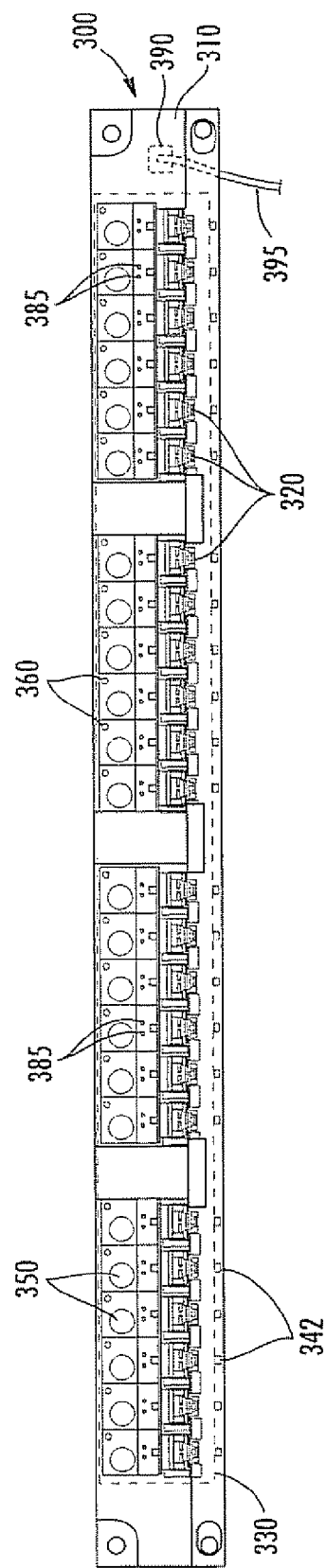
FIG. 4 is a front view of one of the intelligent patch panels of the communications patching system of FIG. 3.

FIG. 4 is a front view of one of the intelligent patch panels 300 of FIG. 3. As shown in FIG. 4, the patch panel 300 includes a mounting frame 310 and twenty-four connector ports 320 that are, in this embodiment, arranged as four groups of six connector ports 320. A printed circuit board 330 is mounted on the front face of the mounting frame 310 above the connector ports 320 so that a top side 332 of the printed circuit board 330 faces forwardly and a back side 334 of the printed circuit board 330 is on the front face of the mounting frame 310. The printed circuit board 330 is shown in outline representation in FIG. 4 as it may be partly or completely hidden beneath a cover or other protective or aesthetic housing. A plurality of trace buttons 350 are mounted on the top side 332 of the printed circuit board 330. As shown in FIG. 4, a trace button 350 is provided for each of the connector ports 320. A plurality of light emitting diodes ("LED") 360 are also mounted on the top side 332 of the printed circuit board 330, with an LED 360 also provided for each connector port 320. As will be discussed in more detail below, an operator may push the trace button 350 that is associated with a first of the connector ports 320 that has a patch cord plugged into it and the communications patching system may then turn on an LED that is associated with a second connector port in the patching system that the other end of the patch cord is plugged into (this second connector port will typically be on a different patch panel or on a network switch or other network device).

As is also shown in FIG. 4, a plurality of pairs of contact pads 385 are provided on the top side 332 of the printed circuit board 330. One pair of contact pads 385 is provided for each connector port 320. In the depicted embodiment, each pair of contact pads 385 is mounted directly above its associated connector port 320. However, it will be appreciated that the contact pads 385 may be positioned in different locations (e.g., below the connector ports 320). It will also be appreciated that, in further embodiments, contact structures other than contact pads may be used such as, for example, contact pins, contact springs, etc.

The patch panel 300 may also include a connection 390 that receives one end of a communications cable 395 (e.g., a ribbon cable, an RJ-45 patch cord, etc.). The other end of the communications cable 395 may be connected directly or indirectly to, for example, the rack manager 220. This communications cable 395 provides a communications path that allows information to be communicated to and from the components that are mounted on the printed circuit board 330 and the rack controller 220.

Figure 5:
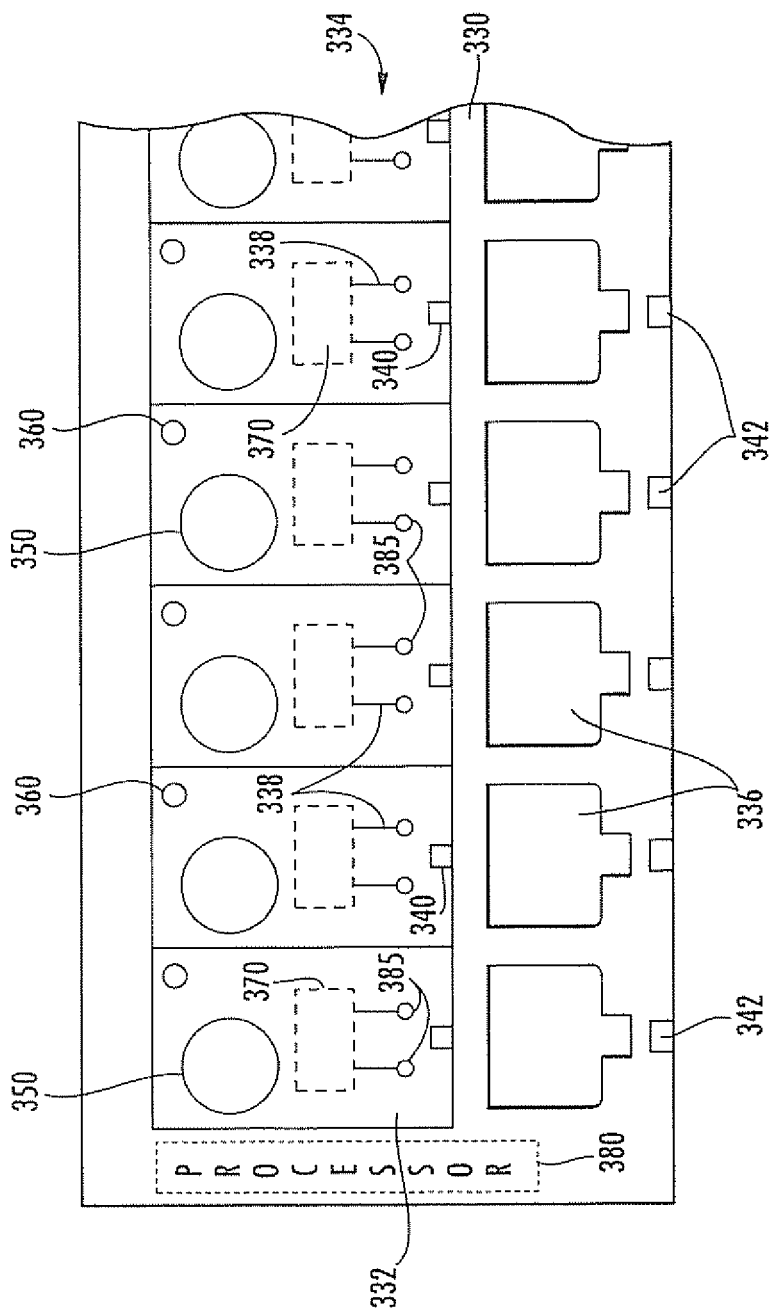
FIG. 5 is a schematic front view of a portion of the printed circuit board of the intelligent patch panel of FIG. 4.

FIG. 5 is a schematic front view of a portion of the printed circuit board 330 of the intelligent patch panel 300 of FIG. 4. The printed circuit board 330 is generally rectangular in shape, and includes a plurality of cut-out areas 336. These cut-out areas 336 each receive a respective one of the connector ports 320 of the patch panel 300 (which, in the particular embodiment of FIG. 4 are RJ-45 style jacks), and hence are also referred to herein as connector port openings 336.

As shown in FIG. 5, the trace buttons 350 and the LEDs 360 are mounted on the top side 332 of the printed circuit board 330, with each trace button 350 and LED 360 being positioned above a respective one of the connector port openings 336. The printed circuit board 330 also includes a plurality of sensors 340 that, in this particular embodiment, are located directly above each of the connector port openings 336. As with the trace buttons 350 and LEDs 360, one sensor 340 is provided for each connector port 320. A plurality of emitters 342 are likewise provided on the front side 332 of printed circuit board 330, with each emitter 342 located below a respective one of the connector port openings 336.

A plurality of serial ID chips 370 are mounted, for example, on the back side 334 of the printed circuit board 330 (and hence are shown using dotted lines). In the depicted embodiment, a serial ID chip 370 is provided for each connector port 320. However, it will be appreciated that, in other embodiments, each serial ID chip 370 may be associated with multiple of the connector ports 320. Additionally, a microprocessor 380 may also be mounted on, for example, the back side 334 of the printed circuit board 330 (and hence is also shown using dotted lines). Finally, a pair of contact pads 385 are positioned just above each of the connector port openings 336. Printed circuit board traces 338 connect each of the contact pads to respective ones of the two pins that are provided on each of the serial ID chips 370. These traces 338 thus place each pair of contact pads 385 into electrical communication with a respective one of the serial ID chips 370. An additional set of printed circuit board traces is provided (not shown in FIG. 3). Each of these traces connect one of each pair of contact pads to an input/output port on the microprocessor 380. Another set of printed circuit board traces is provided (also not shown in FIG. 3), each of which connects the other of each pair of contact pads to a ground reference.

The operation of each of the components of printed circuit board 330 will now be discussed.

The sensors 340 and emitters 342 may be used to detect when patch cords are inserted into and/or removed from the various connector ports 320 on the patch panel 300. In the depicted embodiment, each sensor 340 comprises an infrared detector that is mounted on the printed circuit board 330 just above its associated connector port 320, and each emitter 342 comprises an infrared emitter that is mounted on the printed circuit board 330 just below its associated connector port 320. Thus, the infrared detectors 340 and the infrared emitters 342 may be arranged in pairs, with each infrared detector 340 mounted directly opposite its respective infrared emitter 342 and positioned to receive the infrared beam emitted by its paired infrared emitter 342. The infrared detectors 340 and infrared emitters 342 may be used as follows to detect the insertion and/or removal of patch cords in communications patching systems in which the patch panel 300 is used.

As a plug that is on one end of a patch cord (e.g., one of the patch cords 260 of FIG. 3) is received within one of the connector ports 320 on the patch panel 300 (see FIG. 4), the plug blocks the infrared beam that is emitted by the infrared emitter 342 that is associated with the connector port 320 that receives the plug. Once the infrared beam is blocked by the plug, the infrared detector 340 on the printed circuit board 330 that is positioned on the opposite side of the connector port 320 from the infrared emitter 342 no longer detects the infrared beam. The microprocessor 380 monitors the state of an output of each of the infrared detectors 340 that indicates whether or not the infrared detector 340 is receiving an infrared beam. When the microprocessor 380 determines that one of the infrared detectors 340 is no longer detecting an infrared beam, the microprocessor 380 recognizes this as indicating that a patch cord has been received in the connector port 320 that the particular infrared detector 340 is associated with. Likewise, when a patch cord (e.g., one of the patch cords 260 of FIG. 3) is removed from one of the connector ports 320, the infrared detector 340 that is associated with the connector port 320 will again detect the infrared beam emitted by its corresponding infrared emitter 342. Once again, this information is passed to the microprocessor 380, where that information is recognized as indicating that a patch cord has been removed from the connector port 320 that the particular infrared detector 340 is associated with. In this manner the microprocessor 380 may detect (and record in an associated database or other storage) each instance where a patch cord is inserted into, or removed from, any of the connector ports 320 on the patch panel 300.

While the particular embodiment of the patch panel 300 depicted in FIGS. 4 and 5 includes a microprocessor 380 that tracks the insertions and deletions of patch cords from each of the connector ports 320, it will be appreciated that, in other embodiments, the microprocessor 380 could be omitted and/or another processing device could instead be used to track the patch cord insertions and deletions. For example, the output of each of the infrared detectors 340 could be passed via the connection 390 and the communications cable 395 to, for example, the CPU 222 of the rack manager 220 which may be used instead to perform the functionality of the microprocessor 380.

Likewise, while the intelligent patch panel 300 depicted in FIG. 3 uses infrared emitters 342 and infrared detectors 340 to detect the insertion and removal of patch cords, it will be appreciated that other types of sensing devices may be used. By way of example, in further embodiments of the present invention, each pair of infrared emitters 342 and infrared detectors 340 on printed circuit board 330 may be replaced with a single infrared emitter/detector that emits an infrared signal and then detects infrared energy that may be reflected back to the detector when a patch plug is inserted within the connector port 320. Hence, when such infrared emitter/detectors are used, the absence of any detection of an infrared signal indicates that the associated connector port 320 is not in use, and the detection of reflected infrared energy occurs once a patch cord is plugged into the connector port 320 at issue. The use of the infrared emitter/detector may allow for use of smaller printed circuit boards that only extend above (or below) the connector ports 320 on patch panel 300, as they remove any need for having an emitter and a detector on opposite sides of each connector port 320. In still further embodiments, each pair of infrared emitters 342 and infrared detectors 340 may be replaced by a mechanical or an electro-mechanical switch that is triggered when plugs are inserted into, or removed from, the connector ports 320. It will be appreciated that a wide variety of other detection mechanisms may be used (e.g., optical emitters and detectors, magnetic detectors, mechanical switches and the like). It will also be appreciated that, in some embodiments, various components such as, for example, the trace buttons 350 or and the LEDs 360, may be omitted.

Figure 1:
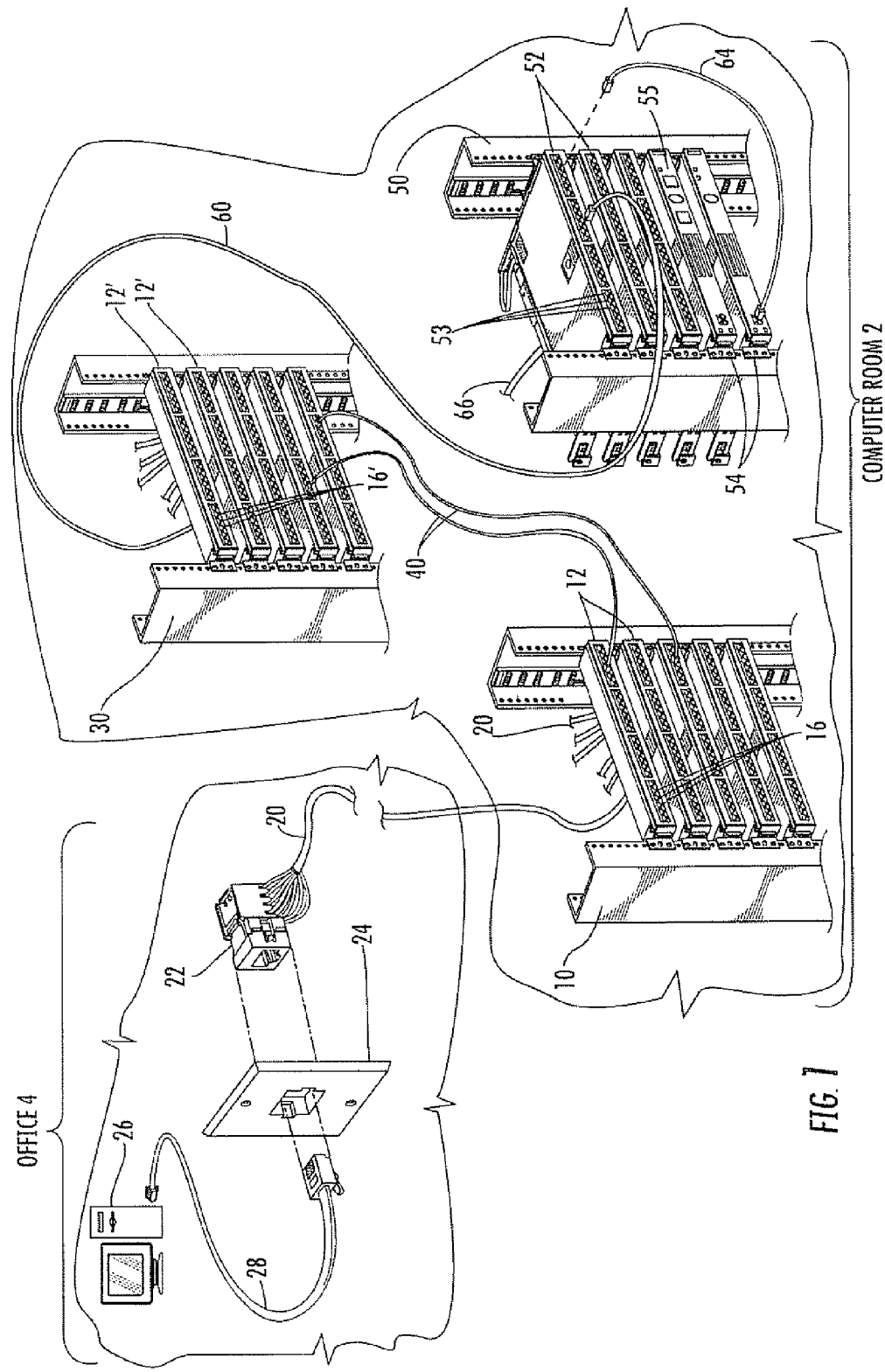
FIG. 1 is a schematic view of a simplified prior art cross-connect communications patching system.
Figure 2:
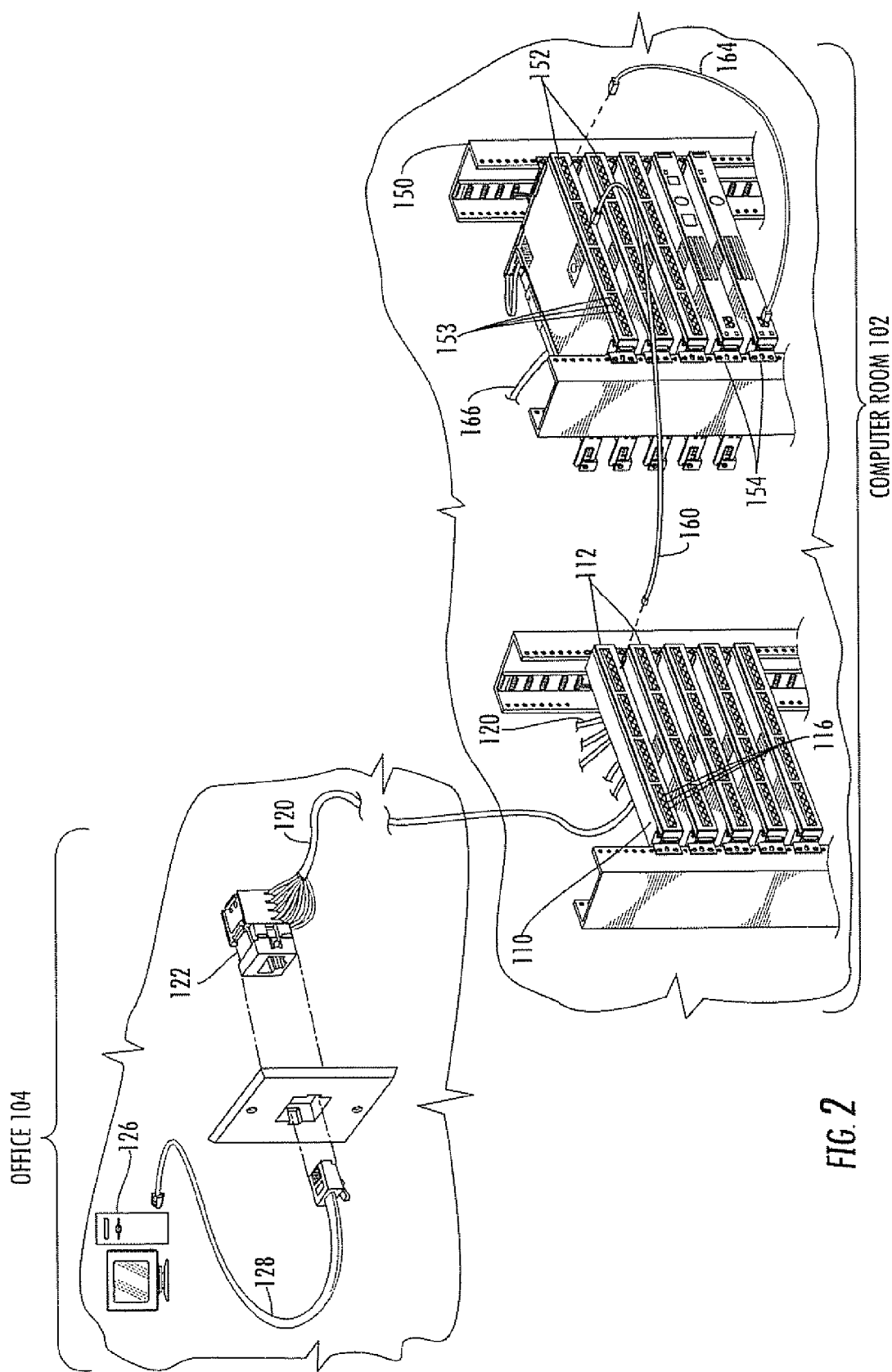
FIG. 2 is a schematic view of a simplified prior art interconnect communications patching system.

By detecting the insertions and removals of patch cords, it is possible to automatically track the patching connections within a communications patching system, if operators of the system follow certain conventions when making patching connections. For example, when an operator inserts the first end of one of the patch cords 240 of FIG. 2 into a connector port on a first of the patch panels 212 (which for purposes of this discussion have the design of the patch panel 300 of FIGS. 4 and 5), as discussed above, the microprocessor 380 on the first patch panel 212 detects this insertion when it stops receiving a detection signal from the sensor 340 associated with the connector port 320 that received the patch cord. The microprocessor 380 may then communicate this information (namely that a patch cord has been inserted into a certain connector port 320 on the second patch panel 212) to the CPU 222 on the rack manager 220 that controls the equipment rack containing this first patch panel 212. At some point in time thereafter, the operator inserts the other end of the patch cord into a connector port 320 on another of the patch panels 212

(this patch panel 212 may be on the same equipment rack as the first patch panel 212 or on a different equipment rack). The microprocessor 380 on this second patch panel 212 detects this insertion when it stops receiving a detection signal from the sensor 340 associated with the connector port 320 that received the other end of the patch cord. The microprocessor 380 on this second patch panel 212 then communicates this information (namely that a patch cord has been inserted into a certain connector port 320 on the second patch panel 212) to the CPU 222 on the rack manager 220 that controls the equipment rack containing the second patch panel 212. As noted above, the various rack managers 220 are networked together and may operate as a single controller, and hence this "controller" knows that a patch cord was inserted into a particular connector port 320 on the first patch panel 212 and that thereafter a patch cord was inserted into a particular connector port 320 on the second patch panel 212. By instructing operators of the communications patching system to always plug in the two ends of a patch cord into their respective connector ports before proceeding to plug in (or remove) any other patch cords in the communications patching system, the communications patching system may make a "logical inference" that a patch cord is connected between the identified connector ports on the first and second patch panels 212. Thus, in this fashion, the communications patching system may automatically track patching connections between the intelligent patch panels 212. Similar operations may be performed to track the removal of patch cords.

The CPUs 222 in the rack managers 220 (which, as noted above, may be interconnected so that they can act together as a controller for the entire system) therefore are capable of automatically monitoring any and all changes that occur with respect to the patch cords that are connected to any of the patch panels in the communications patching system over time. The CPUs 222 of the rack managers 220 may also automatically keep an accurate log of all changes that have occurred with respect to the patch cords since the installation of the communications patching system 200. Accordingly, if a technician is servicing the communications patching system, that technician can read the accurate log straight from the CPU 222 on the display 224 of one of the rack managers 220.

Turning again to FIG. 5, both the trace buttons 350 and the light emitting diodes ("LED") 360 may be mounted on the front face 332 of the printed circuit board 330. A plurality of traces are provided (not shown in FIG. 3 to simplify the drawing) that connect each trace button 350 and each LED 360 to the microprocessor 380 so that a signal triggered by a user pressing any of the trace buttons 350 may be delivered to the microprocessor 380 and so that the microprocessor 380 may send a signal to any of the LEDs 360 that causes the LED 360 to light up. The trace buttons 350 may be used to accurately trace the end points of any patch cord (e.g., one of the patch cords 240 in FIG. 3) that is connected between two of the intelligent patch panels 300 in the communication patching system 200 of FIG. 3.

In particular, if a technician wants to find the opposite end of a particular patch cord 240 that is plugged into a particular connector port 320 on one of the patch panels 300, the technician can press the trace button 350 that is associated with that connector port 320. Upon pressing the trace button 350, a signal is sent to the CPU 222 of the rack manager 220 via the microprocessor 380. As discussed above, the CPUs 222 on the rack managers 220 may automatically track the patching connections using logical inference techniques, and hence have a log that identifies the connector port 320 that the other end of the patch cord at issue is plugged into. The rack manager 220 thus may access this log to identify the patch panel 300 (and connector port 320) that the patch cord is plugged into, and then transmits a signal to the identified patch panel that instructs the patch panel 300 to light the LED 360 associated with the connector port 320 into which the opposite end of the patch cord is inserted. This signal causes the LED 360 that is associated with the connector port 320 that the opposite end of the patch cord is plugged into to light up. Consequently, after pressing the appropriate trace button 350, a technician needs only to look for a lit LED 360 to find the opposite end of the targeted patch cord. Thus, the trace buttons 350 and the LEDs 360 may be used to avoid the wasted time and inaccuracy of manually tracing patch cords.

However, if an operator that is servicing a communications patching system does not follow the specified conventions for inserting and removing patch cords, some of the patching connections that are automatically recorded in the log may be erroneous. Additionally, network equipment such as network switches, network servers and the like are typically manufactured by different entities than the entities that manufacture patch panels. As such, network equipment that includes sensors, microprocessors, LEDs and the various other components that are included on the patch panels 300 are generally not available. Thus, the logical inference technique typically cannot be used to automatically track patching connections in inter-connect style communications patching systems.

Pursuant to embodiments of the present invention, communications patching systems and related methods are provided that may be used to automatically determine and/or confirm patching connections between intelligent patch panels (i.e., to track patch cord connectivity in cross-connect communications patching systems) and/or to automatically determine patching connections between intelligent patch panels and other network equipment (i.e., to track patch cord connectivity in inter-connect communications patching systems). As discussed below, these additional capabilities may be provided, for example, by mounting serial ID chips on network equipment and, in some embodiments, on intelligent patch panels, and by using special patch cords that include both one or more data communications channels as well as a separate control channel that may be used to communicate with the serial ID chips.

Serial ID chips refer to integrated circuit chips that are pre-programmed (either during their manufacture or later by a user or purchaser of the chip) with a unique identifier, and that are configured to transmit a signal that includes the unique identifier in response to receipt of a signal from a master device such as, for example, a microprocessor. In the present application, the unique identifier could be, for example, the serial number or MAC ID of the patch panel on which the serial ID chip is mounted along with the connector port number for the connector port that the serial ID chip is associated with. Exemplary serial ID chips include, for example, 1-wire® chips available from Maxim Integrated Products (formerly Dallas Semiconductor Corp.). In some embodiments, serial ID chips may comprise two pin chips: a first pin that carries signals that are transmitted to and from the serial ID chip and a second pin that carries a ground signal to the chip. The first pin may also be used to provide an operating voltage that powers the serial ID chip.

Turning again to FIG. 5, a plurality of serial ID chips 370 (shown using dotted lines) are mounted on the reverse side 334 of the printed circuit board 330. In some embodiments, a serial ID chip 370 is provided for each connector port 320 on the patch panel 300, while in other embodiments, each serial ID chip 370 may be associated with multiple connector ports 320. Each serial ID chip 370 may be connected to, for example, a respective input/output port of the microprocessor 380 by a trace on the printed circuit board 330 (these traces are not depicted in FIG. 3 to simplify the drawing). Methods by which these serial ID chips 370 may be used to track patching connections will be discussed below with respect to, for example, FIG. 7.

The serial ID chips 370 may be used to automatically gather patch cord connectivity information. According to embodiments of the present invention, patch cords that include a separate control channel may be used to communicate with the serial ID chips 370. Herein, the term "control channel" refers to a communications path that is used to carry control signals including signals that are used to request and/or provide patching connectivity information. This "control channel" is separate from the data channels that are provided in all standard network patch cords and cables that carry information signals that are being transmitted between end devices through the network. For example, in a standard RJ-45 patch cord, the eight conductors that form four differential pairs of conductors form four data channels. Some specialized RJ-45 patch cords are known in the art that include, for example, a ninth conductor. The ninth conductor in these patch cords typically comprises a control channel that carries control information.

Figure 6A:
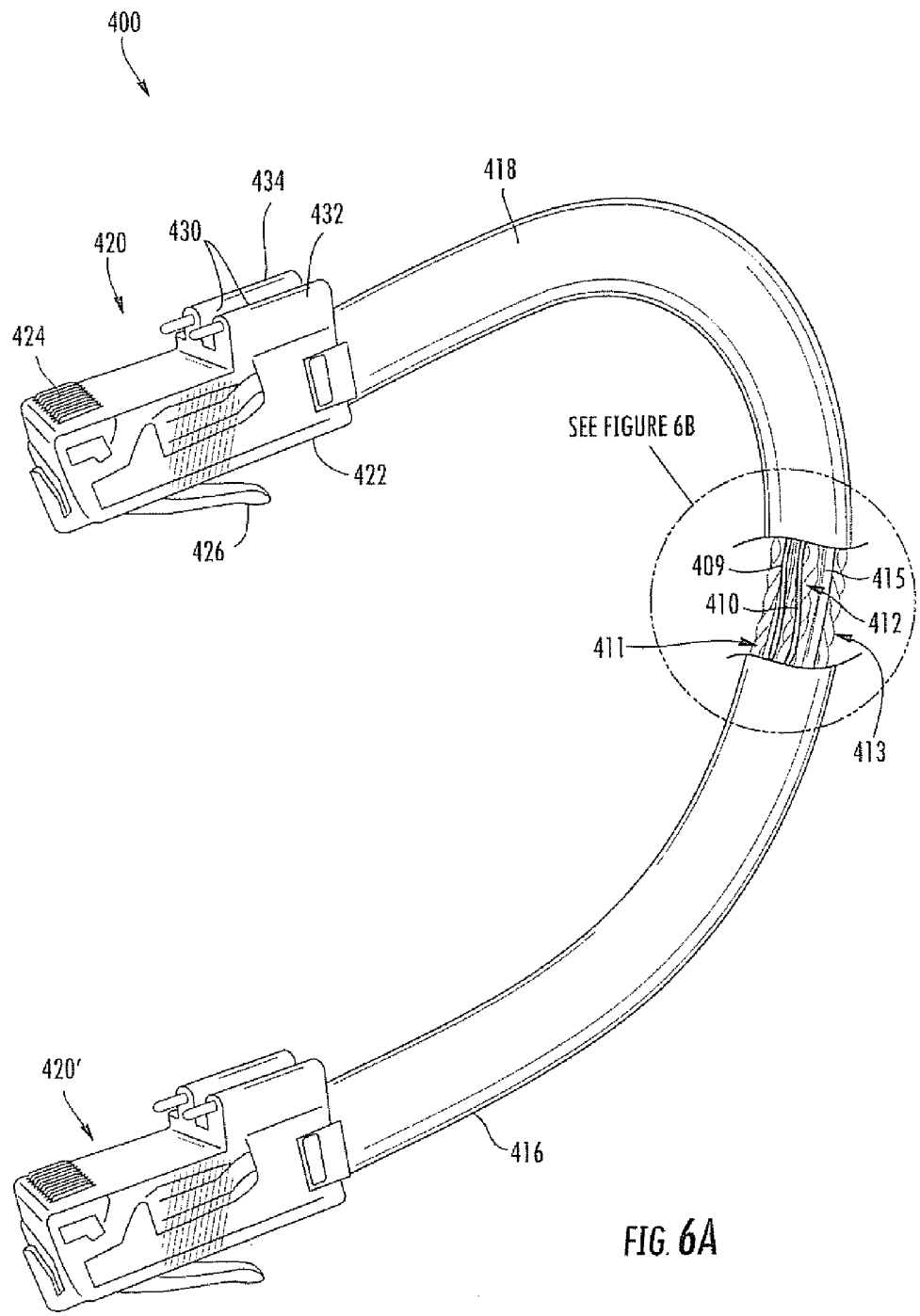
FIG. 6A is a perspective view of a patch cord according to certain embodiments of the present invention.
Figure 6B:
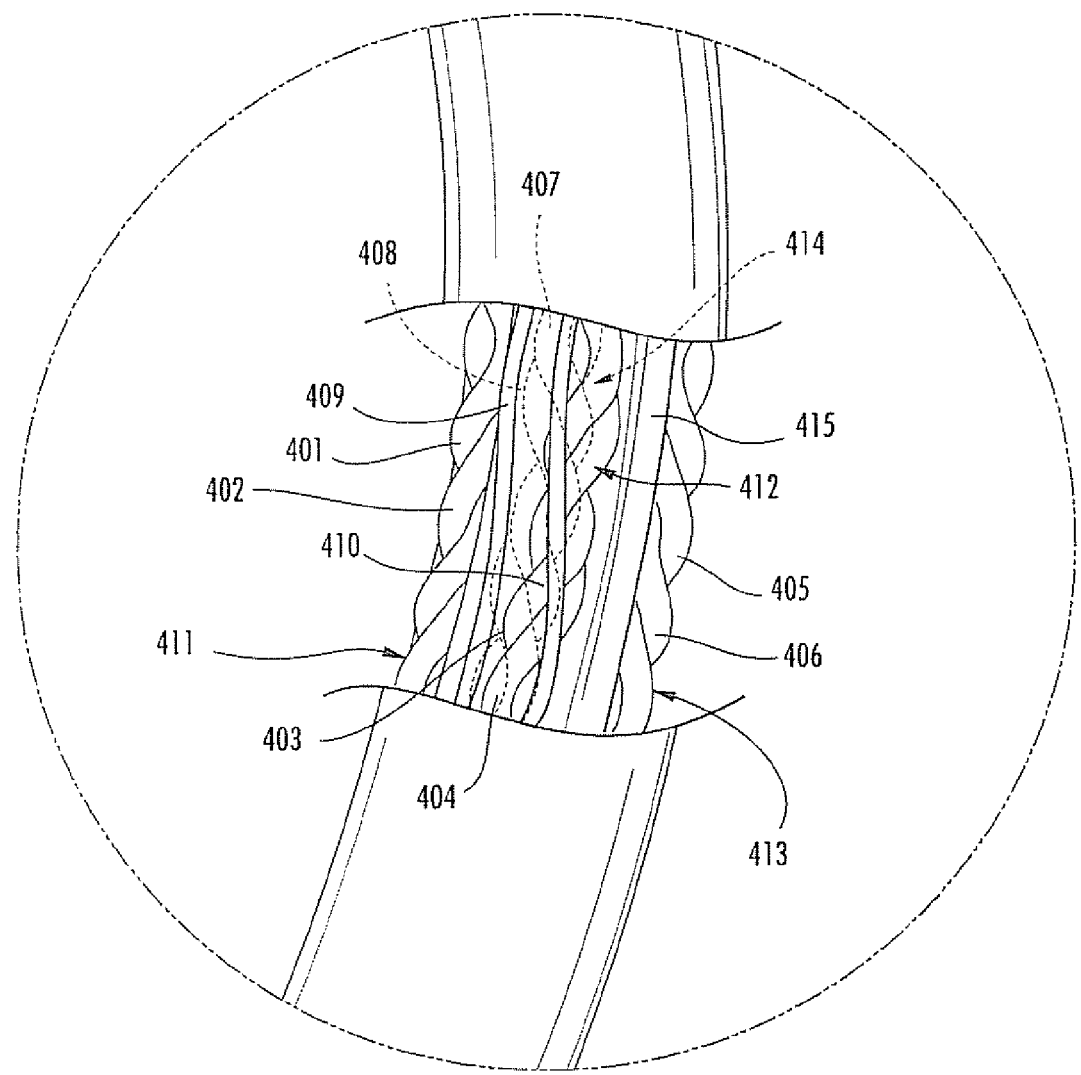
FIG. 6B is an enlarged view of a portion of the patch cord of FIG. 6A.

FIG. 6A is a perspective view of an RJ-45 style patch cord 400 according to embodiments of the present invention that may be used to communicate signals to and from the serial ID chips 370. FIG. 6B is an enlarged view of a portion of the patch cord of FIG. 6A. As shown in FIGS. 6A and 6B, the patch cord 400 includes a communications cable 418 that is terminated with a pair of communication plugs 420, 420'. The communications cable 418 includes eight insulated conductive wires 401-408 that are arranged as four differential pairs of conductive wires 411-414. As known to those of skill in the art, the conductive wires forming each differential pair of conductive wires 411-414 may be tightly twisted together, and each of the pairs 411-414 may have a different twist length. The communications cable 418 may also include a separator 415 that separates at least some of the differential pairs 411-414 from other of the differential pairs 411-414. The eight conductive wires 401-408 and any separator 415 are typically twisted so as to apply a "core twist" to the cable 418, as is known to those of skill in the art.

Additionally, ninth and tenth conductive wires 409, 410 are included within the cable 418. Typically, the ninth and tenth conductive wires 409, 410 will be insulated copper wires, although other conductors may be used, and the insulation may be omitted in certain embodiments. These ninth and tenths wires 409, 410 may be used to transmit signals to and from the serial ID chip 370 associated with the connector port 320 that the patch cord 400 is plugged into. The ninth wire 409 may be a signal carrying wire and the tenth wire 410 may be a ground wire. The ninth and tenth wires 409, 410 may or may not be twisted together. A jacket 416 encloses the first through eighth conductive wires 401-408, the ninth and tenth conductive wires 409, 410 and any separator 415.

As is further shown in FIGS. 6A and 6B, plug 420 includes a plug housing 422, eight plug blades (or other plug contacts) 424 that are mounted at a top forward surface of the housing 422, a plug latch 426 and a pair of serial ID chip contacts 432, 434. Plug 420 may comprise a conventional RJ-45 plug except that the top rear surface of the housing 420 includes raised portions that comprise first and second contact pin housings 430 that house respective ones of the contacts 432, 434. The first and second contact pin housings 430 are separated by a gap 431 that has a width that is at least equal to the width of the first raised portion of the housing 430. The contact 432 may be electrically connected to the ninth wire 409 in the cable 418, via, for example, a wire connection terminal such as an insulation displacement contact or an insulation piercing contact (not shown in FIG. 6A). The contact 434 may be electrically connected to the tenth wire 410 in the cable 418 in a similar fashion. In the particular embodiment depicted in FIGS. 6A and 6B, the contacts 432, 434 may be "pogo" style contacts in that each contact 432, 434 comprises a conductive pin that is spring loaded in its respective contact pin housing 430. Plug 420' may be identical to plug 420 and hence will not be discussed separately herein.

When one of the plugs 420 is inserted into one of the RJ-45 connector ports 320 on the patch panel 300, the contacts 432, 434 come into physical contact with the front face of the patch panel 300 just above the plug receiving cavity of the connector port 320 that the plug 420 is received within. The contacts 432, 434 are positioned within the plug housing 420 so that each of the contact pins 432, 434 will be driven backwards a small distance into its contact pin housing 430 by the front face of the patch panel 300 when the plug 420 is fully inserted within and latched within the connector port 320. The spring loaded design of the contact pins 432, 434 allows this backward movement of the contact pins 432, 434, and the spring bias on each of the contact pins 432, 434 provides a force that holds each contact pin 432, 434 in firm contact with the contact surface on the front face of the patch panel 300.

Referring back to FIG. 4, it can be seen that a pair of contacts (in the form of a pair of contact pads 385) are provided on the patch panel 300 above the plug receiving cavity of each connector port 320. The plug 420 may be designed so that each of the contact pins 432, 434 comes into contact with a respective one of the pairs of contact pads 385 when the plug 420 is received within one of the connector ports 320. Thus, the contact pins 432, 434 on plug 420 and a respective one of the pairs of contact pads 385 may provide a communications path that allows a data signal carried on the ninth conductive wire 409 and a ground reference carried on the tenth conductive wire 410 to be transmitted over the patch cord 400 to or from the serial ID chip 370 that is associated with the connector port 320 that the patch cord 400 is plugged into.

In certain embodiments of the present invention, the forward edge of the contact pins 432, 434 (i.e., the end of the contact pins that is farthest from the cable 418) may be set back at least about 0.500 inches from the forward (leading) edge of the plug 420. This arrangement may facilitate ensuring that the contact pins 432, 434 do not come into contact with the front face of patch panels or network devices that do not include mating pairs of contacts such as the pairs of contact pads 385 on the patch panel 300. As is known to those of skill in the art, a ground plane is typically provided that surrounds the connector ports on patch panels, network switches and other network devices. If the contact pins 432, 434 extend too far forward, they may come into contact with this ground plane, thereby shorting all of the contact pins 432, 434 together, which can cause problems if the system is not designed to handle this condition.

Figure 7:
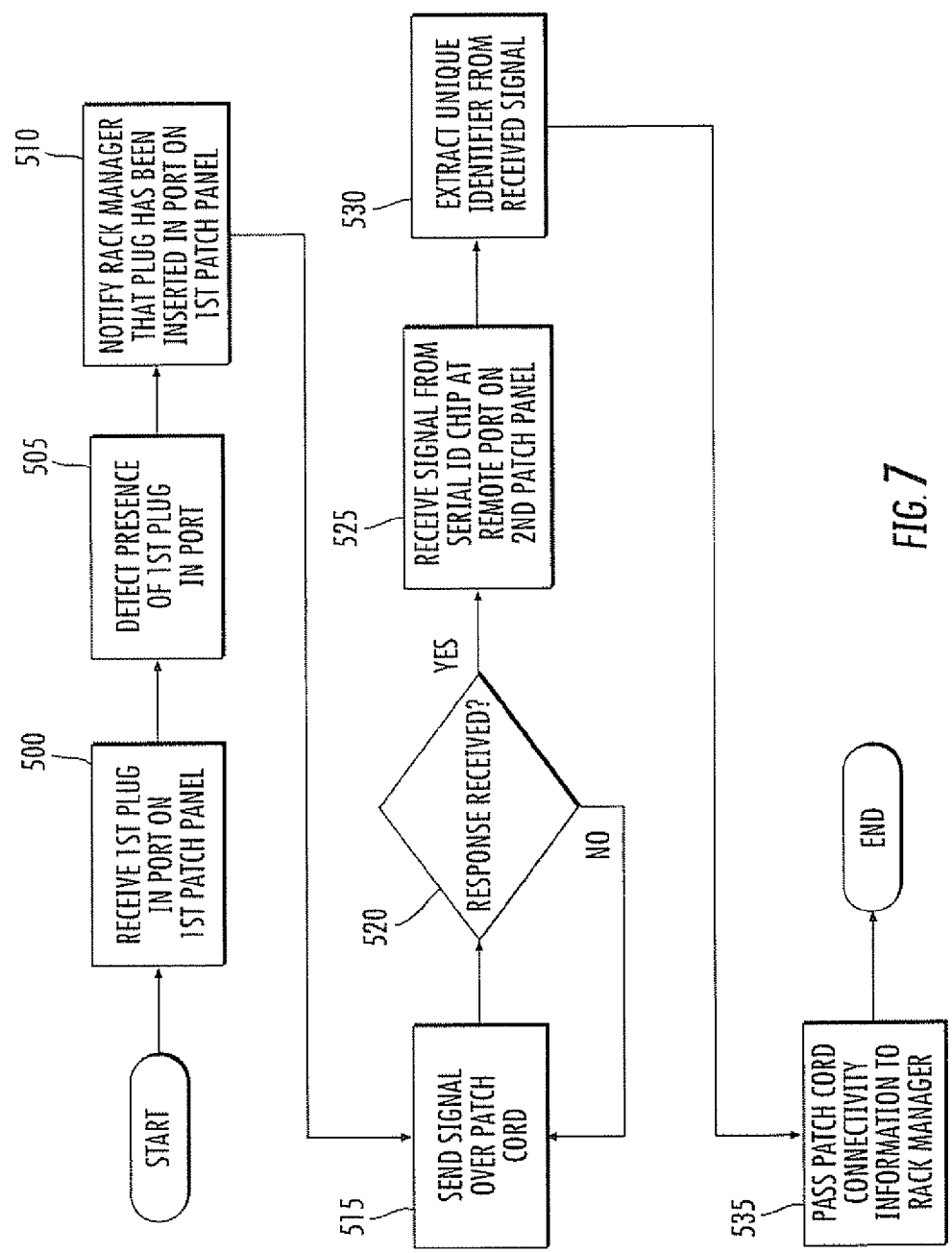
FIG. 7 is a flow chart illustrating methods for automatically tracking a patching connection according to certain embodiments of the present invention.

FIG. 7 is a flow chart that illustrates a method according to embodiments of the present invention of automatically determining patch cord connectivity for patch cords (e.g., the patch cords 400 of FIGS. 6A and 6B) that are routed between two intelligent patch panels (e.g., the patch panel 300 of FIG. 4 and an identical patch panel 300'). As shown in FIG. 7, operations may begin with a technician inserting the plug 420 of patch cord 400 into one of the connector ports 320 of patch panel 300 (block 500). The intelligent patch panel 300 detects the presence of the plug 420 in the connector port 320 (block 505). This detection may be accomplished, for example, by the sensor 340 that is associated with the connector port 320 that receives the plug 420. Upon detecting that the plug 420 has been received in the connector port 320, the microprocessor 380 on patch panel 300 may notify the rack manager 220 that a plug has newly been detected and further provide the rack manager 220 an identifier of the specific connector port 320 that received the plug (block 510).

The microprocessor 380 may be connected to the contact pads 385 in a variety of ways. For example, in some embodiments, a switching circuit may be provided that may be used to direct a signal output by the microprocessor 380 to a selected one of the pairs of contact pads 385. In other embodiments, the microprocessor may have a plurality of output pins, and individual traces may connect each of the output pins on the microprocessor 380 to respective ones of the pairs of contact pads 385. In still other embodiments, a serial bus approach could be used.

Next, the microprocessor 380 may send a signal over the newly detected patch cord (block 515). As discussed above, traces on the printed circuit board 330 may provide communications path between the microprocessor 380 and at least one contact pad 385 of each of the pairs of contact pads. The microprocessor 380 sends the signal over one of these traces to one of the contact pads of the pair of contact pads 385 associated with the connector port 320 at issue. The signal passes though the contact pad 385 and is carried on the ninth wire 409 (with a ground reference supplied by the patch panel 300 carried on the tenth wire 410) of the patch cord 400 to the plug 420 on the far end of the patch cord 400. Next, the microprocessor 380 monitors for a response to the signal (block 520). If the plug 420' on the far end of the patch cord 400 is not plugged in (or is plugged into a connector port that does not have intelligent patching capabilities), then no such signal will be received. If no signal is received, operations return to block 515 and the microprocessor 380 again sends a signal through the contact pads 385 to the newly detected patch cord after a period of time. If the plug 420' is plugged into a connector port 320' on another intelligent patch panel 300', then the contacts 432', 434' on plug 420' will be in contact with the contact pads 385' that are located on the printed circuit board 330' of the patch panel 300'. These contact pads 385' place the ninth and tenth wires 409, 410 of the patch cord 400 in communication with the serial ID chip 370' that is associated with the connector port 320'. Consequently, if the plug 420' is plugged into a connector port 320' on patch panel 300', then the signal from the microprocessor 380 will be received by the serial ID chip 370' on the patch panel 300'.

As is known to those of skill in the art, serial ID chips such as the serial ID chips 370, 370' may be designed so that they draw their operating voltage over the data line input port. In particular, while not shown in FIG. 7, before the microprocessor 380 transmits a signal to the serial ID chip 370' over the ninth and tenth wires 409, 410 of the patch cord 400, the microprocessor 380 may raise the voltage on the signal line 409 of the patch cord 400 to, for example, 3 to 5 volts. This voltage may be used to power the serial ID chip 370'. As a result, the serial ID chip 370' does not require a separate power source.

Referring again to FIG. 7, when the serial ID chip 370' receives the signal that is transmitted over the ninth and tenth wires 409, 410 of the patch cord 400, it sends a responsive signal back over the patch cord 400 to the microprocessor 380 (block 525). This responsive signal includes the unique identification number associated with the connector port 320' that the plug 420' of patch cord 400 is inserted within. This unique identifier may then be extracted from the received signal by the microprocessor 380 (block 530). The microprocessor 380 may then pass the unique identifiers of the two connector ports 320, 320' that are connected by the patch cord 400 to the rack manager 220 (block 535) for logging in a database or table of patch cord connections. Thus, in this fashion, the rack manager 220 on the equipment rack that includes patch panel 300 can automatically determine and log the identifiers of the connector ports 320, 320' on patch panels 300, 300' that are connected by the patch cord 400. This information may be used to affirmatively track the patching connections between intelligent patch panels in the communications patching system, or, alternatively, may be used to confirm the patching connections that are recorded by another automatic tracking mechanism such as, for example, the logical inference tracking mechanism discussed above.

The above example illustrates how patch panels such as panels 300 and 300' and patch cords such as patch cord 400 may be used to automatically track patching connectivity in a cross-connect communications patching system that uses intelligent patch panels according to embodiments of the present invention. Pursuant to further embodiments of the present invention, passive electronic labels are provided that may be mounted on network switches, routers, servers and other network devices. These passive labels include serial ID chips that facilitate automatically tracking patch cord connectivity between intelligent patch panels and network devices, and hence provide the capability for automatic tracking of patching connections in inter-connect communications patching systems.

Figure 8:
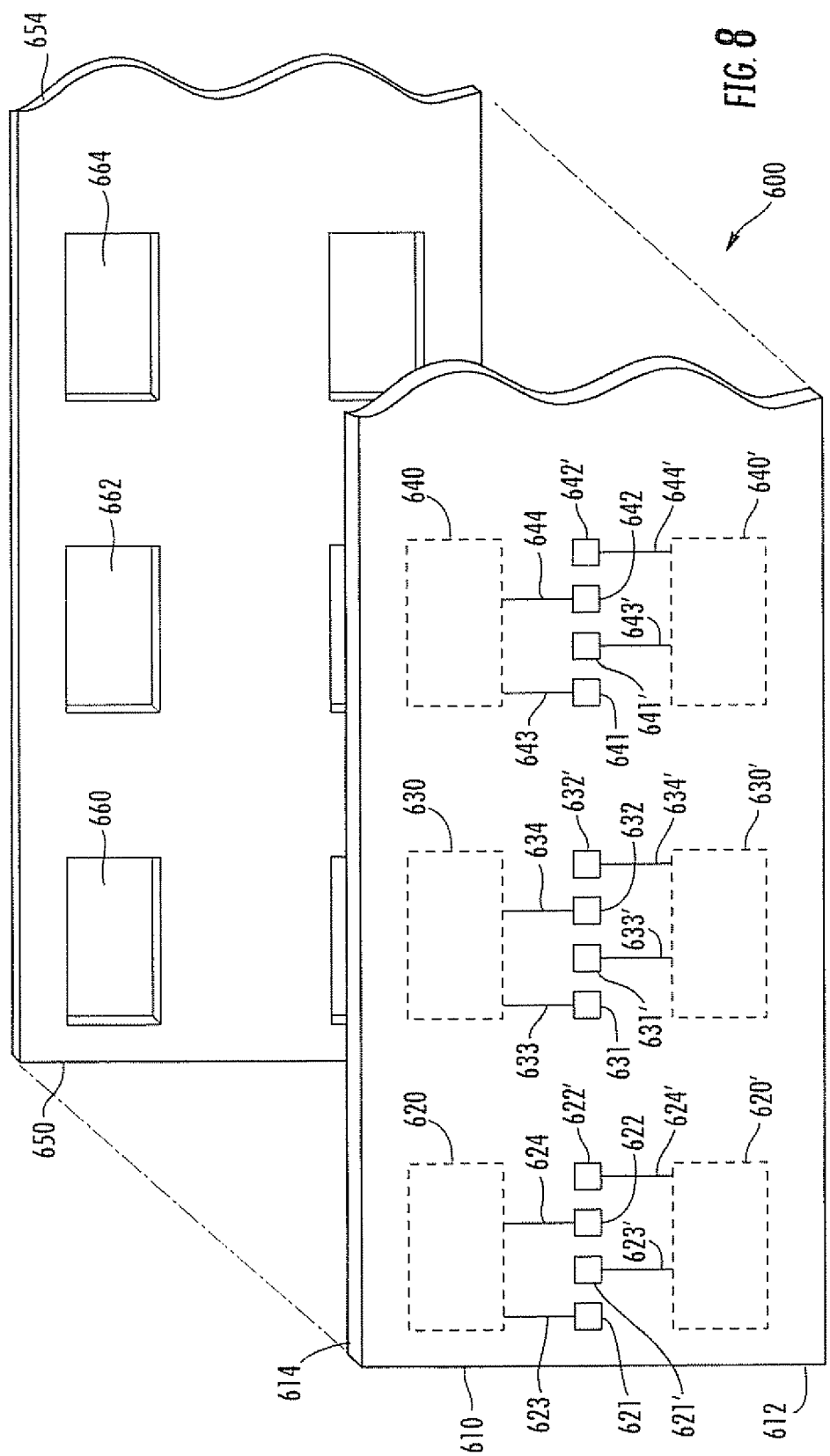
FIG. 8 is an enlarged exploded perspective view of a portion of a passive label according to certain embodiments of the present invention that may be mounted on network equipment to provide the network equipment with intelligent patching capabilities.

FIG. 8 is an exploded perspective view of a portion of a passive electronic label 600 according to certain embodiments of the present invention that may be mounted on network equipment to provide the network equipment with intelligent patching capabilities. The portion of the passive label 600 depicted in FIG. 8 includes a total of six serial ID chips 620, 630, 640, 620', 630', 640'. However, it will be appreciated that the label 600 may have any number of serial ID chips, including as few as one (i.e., for network servers that have a single connector port) to, for example, as many as forty-eight (i.e., for network switches that have multiple rows of 24 connector ports) or more. It will also be appreciated that the arrangement of the components on the label 600 may be varied in other embodiments. Moreover, while the label 600 provides a serial ID chip for each connector port on the network device on which the label 600 is mounted, it will also be appreciated that, in other embodiments, each serial ID chip may comprise multi-pin devices that store unique identifiers that are associated with multiple connector ports so that the number of serial ID chips is less than the total number of connector ports on the network device.

As shown in FIG. 8, the label 600 includes a double sided printed circuit board 610 that has a front side 612 and a back side 614, six serial ID chips 620, 630, 640, 620' 630', 640' that are mounted in two rows on the printed circuit board 610, and an adhesive layer 650. The serial ID chips 620, 630, 640, 620', 630', 640' are each mounted on the back side 614 of the printed circuit board 610 (and hence are depicted using dotted lines in FIG. 8). A first pair of contact pads 621, 622 is provided on the front side 612 of the printed circuit board 610 that is associated with the first serial ID chip 620. A first trace 623 connects the contact pad 621 to a first input port on the serial ID chip 620, and a second trace 624 connects the contact pad 622 to a second port on the serial ID chip 620. As is also shown in FIG. 8, a second pair of contact pads 631, 632 is provided on the front side 612 of the printed circuit board 610 that is connected by traces 633, 634, respectively to first and second ports on the second serial ID chip 630, and a third pair of contact pads 641, 642 is provided on the front side 612 of the printed circuit board 610 that is connected by traces 643, 644, respectively to first and second ports on the third second serial ID chip 640. Each of the contact pads 621, 631, 641 provides a power connection path and a data path for its associated serial ID chip 620, 630, 640, and each of the contact pads 622, 632, 642 may provide a ground connection for its associated serial ID chip 620, 630, 640. Serial ID chips 620', 630' and 640' are connected to respective pairs of contact pads 621', 622'; 631', 632'; 641', 642' in an identical manner, and hence these serial ID chips will not be discussed further herein.

The adhesive layer 650 is mounted on the back side 614 of the printed circuit board 610. The adhesive layer 650 may comprise, for example, a thin substrate that has an adhesive applied to each side thereof. As the serial ID chips 620, 630, 640 extend for some distance (e.g., 0.030 inches) from the back side 614 of the printed circuit board 610, the adhesive layer 650 may include a respective opening 660, 662, 664 for each serial ID chip 620, 630, 640 (and corresponding openings, not visible in FIG. 8, for serial ID chips 620', 630', 640'). When the adhesive layer 650 is applied to the back side 614 of the printed circuit board 610, each serial ID chip is recessed within its respective one of these openings. The adhesive layer 650 is sufficiently thick so that the back side 654 of the adhesive layer extends farther rearwardly than do the serial ID chips 620, 630, 640, 620', 630', 640'. In this fashion, the back side 654 of the adhesive layer 650 may have a flat profile for mating with a front face on the network device on which the label 600 is to be mounted. Moreover, by including the openings for the serial ID chips, the overall thickness of the label 600 may be reduced.

Figure 9:
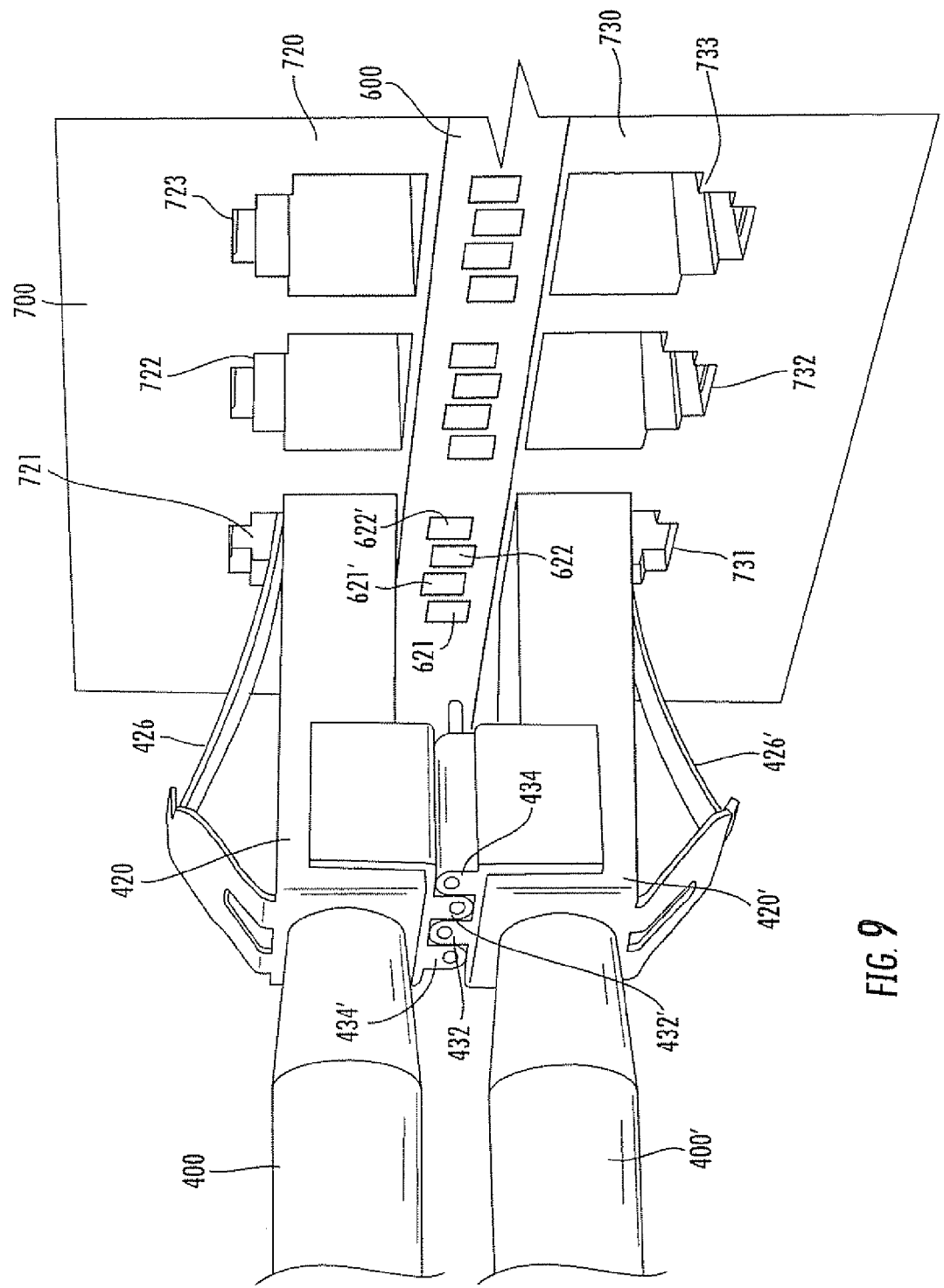
FIG. 9 is a perspective view of the label of FIG. 8 mounted on a network device.

FIG. 9 is a perspective view of the label 600 of FIG. 8 mounted on a network device 700 that includes a top row 720 of connector ports 721, 722, 723 and a bottom row 730 of connector ports 731, 732, 733. FIG. 9 also depicts two of the patch cords 400 of FIGS. 6A and 6B (labelled 400 and 400' in FIG. 9) that have plugs 420, 420', respectively, aligned for insertion into the connector ports 721 and 731. As shown in FIG. 9, the label 600 is adhesively mounted between the two rows 720, 730 of connector ports. The connector ports 721, 722, 723 in the top row 720 are positioned so that the latch 426 on the plug 400 points upward, while the connector ports 731, 732, 733 in the bottom row 730 are rotated 180 degrees with respect to the connector ports in the top row 720 so that the latch 426' on the plug 400' points downward.

As discussed above with respect to FIG. 8, the label 600 includes a plurality of pairs of contact pads 621, 622; 631, 632; 641, 642; 621', 622'; 631', 632'; 641', 642'. These pads are aligned in two horizontal rows along the front side 612 of the printed circuit board 610. As discussed above, each of the pairs of contact pads 621, 622; 631, 632; 641, 642; 621', 622'; 631', 632'; 641', 642' is associated with a respective one of the connector ports 721, 722, 723, 731, 732, 733 on the network device 700. In the depicted embodiment, the contact pads are grouped into a first set of four contact pads 621, 622, 621', 622' that is located between connector ports 721 and 731, a second set of four contact pads 631, 632, 631', 632' that is located between connector ports 722 and 732, and a third set of four contact pads 641, 642, 641', 642', that is located between connector ports 723 and 733. As can best be seen in FIG. 8, the contact pads in each group of four are interlaced. By way of example, contact pads 621 and 622 form a first pair of contact pads that is associated with the connector port 721, while contact pads 621' and 622' form a second pair of contact pads that is associated with the connector port 731.

As is also shown in FIG. 9, the plugs 420, 420' each have a pair of pogo-style spring-loaded contact pins 432, 434; 432', 434'. As the orientation of plug 420' is rotated 180 degrees with respect to the orientation of plug 420 when the plugs are inserted into their respective connector ports 721 and 731, the contact pins 432 and 434 are offset from the contact pins 432' and 434' and are arranged to line up with their respective mating contact pads 621, 622; 621', 622' on the label 600. Moreover, as shown in FIG. 9, the contact pins 432, 434; 432', 434 may all be generally aligned in a single row when the plugs 420, 420' are inserted within the connector ports 721, 731. As can be seen in FIG. 9, this arrangement may allow use of the plugs and labels according to embodiments of the present invention on network devices that have multiple rows of connector ports that have small spacing between adjacent rows.

Since the label 600 is designed to be attached to the front face of a network device, the front surface of the label 600 may extend, for example, perhaps 200 mils beyond the front face of the network device once mounted. As such, the length and positioning of the contact pins 432, 434 on the patch cord 400 may be designed so that the contact pins 432, 434 will make mechanical and electrical contact with the label 600, but will not make mechanical or electrical contact with a network device which does not include a passive label according to embodiments of the present invention.

The label 600 of FIGS. 8 and 9 may operate as follows. When the plug 420 (not visible in FIG. 9) on the far end of patch cord 400 is inserted into a connector port of a patch panel (not shown in FIG. 9) of an intelligent patching system according to embodiments of the present invention (e.g., into one of the connector ports 320 of the patch panel 300 of FIG. 4), the sensor 340 on patch panel 300 detects the presence of the plug 420, and the microprocessor 380 on patch panel 300 then transmits a signal that is carried over the conductors 409, 410 of the patch cord 400 that comprise the control channel, with the signal being carried on the conductor 409 of patch cord 750 and the ground reference being carried on conductor 410. Once the plug 420 on the other end of patch cord 400 has been inserted into the connector port 721 on the network device 700 as depicted in FIG. 9, the contacts 432 and 434 make mechanical and electrical contact with the contact pads 621 and 622 on the label 600. Thus, the signal and the ground reference are coupled from conductors 409 and 410, respectively, onto the contact pins 432 and 434 of plug 420, respectively, where they are transferred to the contact pads 621 and 622, respectively, on the label 600. The signal from conductor 409 is carried on the trace 623 to the serial ID chip 620 that is associated with connector port 721, and the ground reference is provided to the serial ID chip 620 over the trace 624. Thus, the conductors 409, 410 of patch cord 400, the contacts 432, 434 of plug 420, and the contact pads 621, 622 and traces 623, 624 on label 600 provide a control communications path from the plug 420 that is inserted into a connector port 320 on the patch panel 300 to the serial ID chip 620 on label 600.

Moreover, as discussed above, the microprocessor 380 may supply a voltage of, for example, 3 to 5 volts, to the signal line 409 so that the signal line 409 may also provide an operating voltage that powers the serial ID chip 620. As a result, the serial ID chip 620 need not draw power separately from the network device 700, and thus the label 600 may be a passive electronic label that does not include any electrical communication or power connection to the network device 700 on which the label 600 is mounted.

Once the patch cord 420 is plugged into the connector port 721, the serial ID chip 620 can receive the signal that is transmitted by the microprocessor 380. As discussed above, the microprocessor 380 on the patch panel 300 may, in some embodiments, periodically transmit a signal after detecting insertion of a patch cord into one of the connector ports on the patch panel 300 until such time as a response is received (or until a timeout period is reached). In response to receiving such a signal, the serial ID chip 620 may send a responsive signal to the microprocessor 380 over the conductor 409 of the patch cord 400. This responsive signal may include the unique identification number that has been previously programmed into the serial ID chip 620. Thus, according to embodiments of the present invention, the intelligent patching system may determine the patching connectivity with respect to patch cords that are connected between standard network devices and patch panels of the intelligent patching system, as passive labels such as the labels 600 may be used to provide an intelligent patching capability to such standard network devices.

It will be appreciated that a wide variety of network devices are in existence. As such, a number of different label designs may be required, with each label designed to fit on specific network devices. For example, a first label design may be provided that is configured for use on network devices such as switches and servers that have a single row of RJ-45 connector ports or which have multiple rows of connector ports with all of the connector ports having the same orientation. A second label design may be provided that is configured for use on network devices having pairs of rows of connector ports where the connector ports in adjacent rows are rotated by 180 degrees with respect to each other (as is shown in FIG. 9 above). A third label may be provided that is configured for use on network devices that contain a very small number of connector ports (e.g., 1-3 connector ports) as may be the case on PBXs, PDUs, UPSs, etc. Additional labels may be provided that are configured for use on network devices having fiber optic connector ports.

Figure 10:
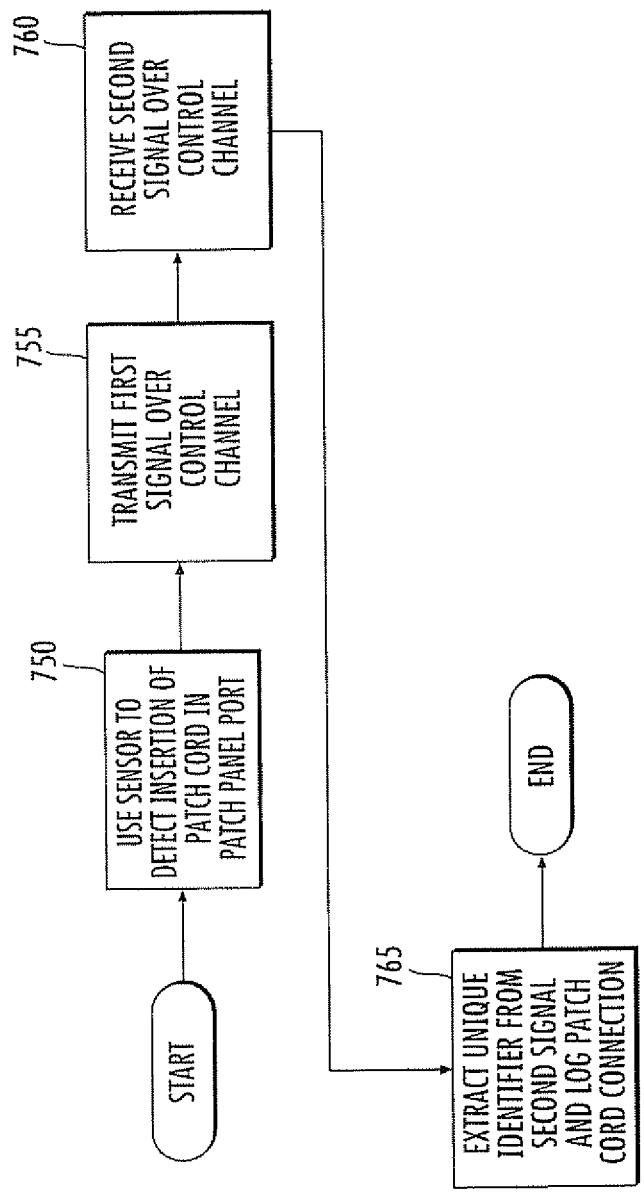
FIG. 10 is a flow chart illustrating methods for automatically tracking a patching connection according to further embodiments of the present invention.

FIG. 10 is a flow chart illustrating methods for automatically tracking a patching connection that is made by inserting a first end of a patch cord into a first connector port of a patch panel and by inserting a second end of the patch cord into a second connector port on a network device according to certain embodiments of the present invention. As shown in FIG. 10, a sensor may be used to detect that the first end of the patch cord has been inserted into the first connector port (block 750). In response to this detection, a first signal is transmitted over a separate control channel of the patch cord to the network device (block 755). The control channel may comprise a first conductor that carries the first signal and a second conductor that carries a ground reference. Then, in response to the first signal, a second signal may be received over the separate control channel of the patch cord (block 760). This second signal may include a unique identifier that is associated with the second connector port on the network device. Identifiers for the first and second connector ports may be then logged in a table or database of patching connections (block 765).

Figure 11:
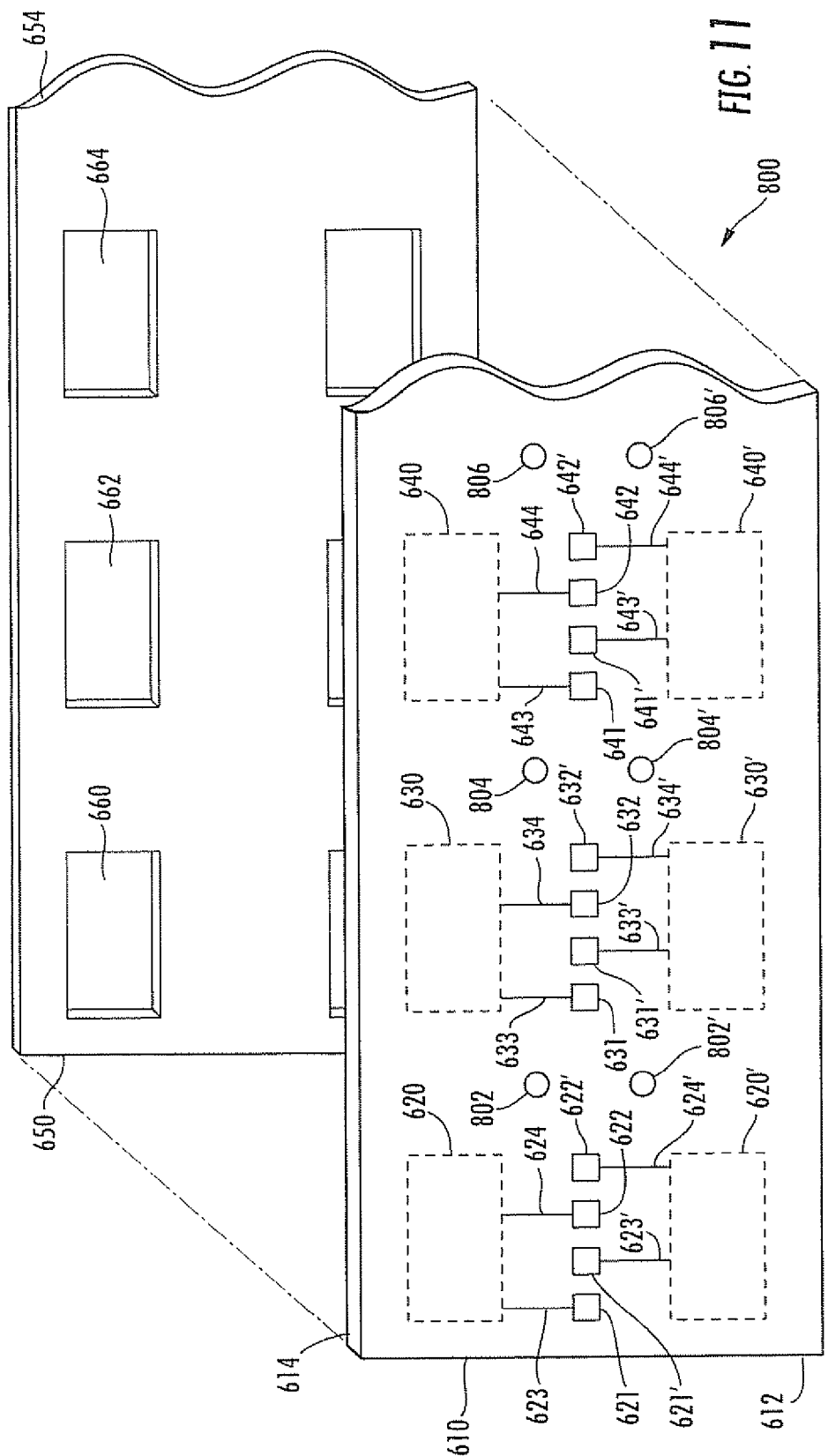
FIG. 11 is a perspective view of a passive label according to further embodiments of the present invention.

FIG. 11 is a front view of a passive label 800 according to further embodiments of the present invention. The label 800 may be almost identical to the label 600 of FIGS. 8 and 9 (and hence components of the label 800 that were previously described with respect to label 600 will not be re-described here) except that the label 800 further includes a plurality of LEDs 802, 804, 806, 802', 804', 806' that are mounted on the front side 812 of the printed circuit board 810. One LED may be provided for each serial ID chip 820, 830, 840 so that an LED will be provided for each connector port on the device on which the label 800 is to be mounted. While not depicted in FIG. 11 to simplify the drawing, trace pairs may run from each pair of contact pads 821, 822; 831, 832; 841, 842; 821', 822'; 831', 832'; 841', 842' to a respective one of the LEDs 802, 804, 806, 802', 804', 806' to provide power to the LED. In this fashion, the separate control channel of a patch cord that is received within one of the connector ports on the network device may also be used to carry a power signal that is used to light the LED that is associated with the connector port at issue on the network device. While such LEDs may be somewhat difficult for an operator to see on the label 800 when the network device on which the label 800 is mounted has a large number of patch cords inserted, on labels that are configured to be mounted on network devices having a single row of connector ports the LEDs can be positioned where they can be easily viewed by an operator.

The LED 802 depicted in FIG. 11 may operate as follows when a patch cord 400 of FIGS. 6A and 6B is connected between one of the connector ports 320 on the patch panel 300 of FIGS. 4 and 5 and the connector port on a network device on which the label 800 is mounted (i.e., the connector port associated with serial ID chip 620). When, for example, an operator presses (i.e., activates) the trace button 350 associated with the connector port 320 on a patch panel 300 that the patch cord 400 is plugged into, the microprocessor 380 on the printed circuit board 330 of patch panel 300 may provide a power signal to the pair of contact pads associated with the connector port 320. This power signal is then carried over the control channel on the patch cord 400, where it is transferred from the patch cord 400 to the LED 802 via the contact pads 821, 822 and the traces 823, 824. Thus, according to embodiments of the present invention, patch cord tracing capabilities may also be provided with respect to patch cords that are plugged into network devices such as network switches, routers and servers.

In some embodiments, activation of trace button 350 may trigger the microprocessor 380 to transmit a signal over the control channel that is used to determine and/or verify the unique identifier of any serial ID chip (e.g., serial ID chip 620) that is associated with the connector port on the network device on which the label 800 is mounted. Thus, for example, activation of the trace button 350 may first result in a signal being sent over the patch cord to discover/verify the unique identifier on any such serial ID chip using, for example, the procedure shown at blocks 755 to 765 of FIG. 10. Then, a power signal may be transmitted over the control channel to light the LED 802. Alternatively, the LED 802 could be lit first, and then the signal could be sent over the control channel to discover/verify the unique identifier on the serial ID chip 620. The label 800 may be designed so that the serial ID chips 620, 630, 640, 620', 630', 640' and the LEDs 802, 804, 806, 802', 804', 806' operate at different voltages. As such, the microprocessor 380 of patch panel 300 may apply a first voltage (e.g., 5 volts) to the conductor 409 of the control channel to power one of the serial ID chips, and may apply a second voltage (e.g., 2.5 volts) to the conductor 409 of the control channel) to power one of the LEDs.

Pursuant to further embodiments of the present invention, the patch cords 400 described above with reference to FIGS. 6A and 6B may be modified to include an LED 450 in the plug 420 and an LED 450' in the plug 420'. These LEDs 450, 450' may be mounted on or within the plug housings 422, 422'. In embodiments where the LEDs 450, 450' are mounted within the plug housings 422, 422', all or part of the plug housings 422, 422' may be light transmissive so that the light emitted by the LEDs 450, 450' may be visible outside the housing. The LEDs 450, 450' may be powered by the voltage that is applied to the conductor 409 of the control channel, as most LEDs have a turn-on voltage that is less than 3 volts. In such embodiments, all or part of the housing 422, 422' of each plug 420, 420' may be transparent or at least semi-transparent so that the light emitted by the LEDs 450, 450' is visible to an operator. By placing the LEDs 450, 450' in the plugs 420, 420', the design of the passive labels that are attached to network devices may be simplified while still providing a patch cord tracing capability with respect to patch cords that are plugged into network devices. As discussed above, when, for example, an operator presses the trace button 350 associated with the connector port 320 on a patch panel 300 that this modified patch cord is plugged into, the microprocessor 380 on the printed circuit board 330 of patch panel 300 may provide a power signal to the pair of contact pads associated with the connector port 320. This power signal is then carried over the control channel on the modified patch cord to one or both of the LEDs 450, 450'. As discussed above, the LEDs and serial ID chips may be designed to be powered on at different voltage ranges so that the microprocessor 380 of patch panel 300 may selectively choose to power up a serial ID chip or light the LEDs 450, 450' by applying a specific voltage level to the conductor 409 of the control channel.

Figure 14:
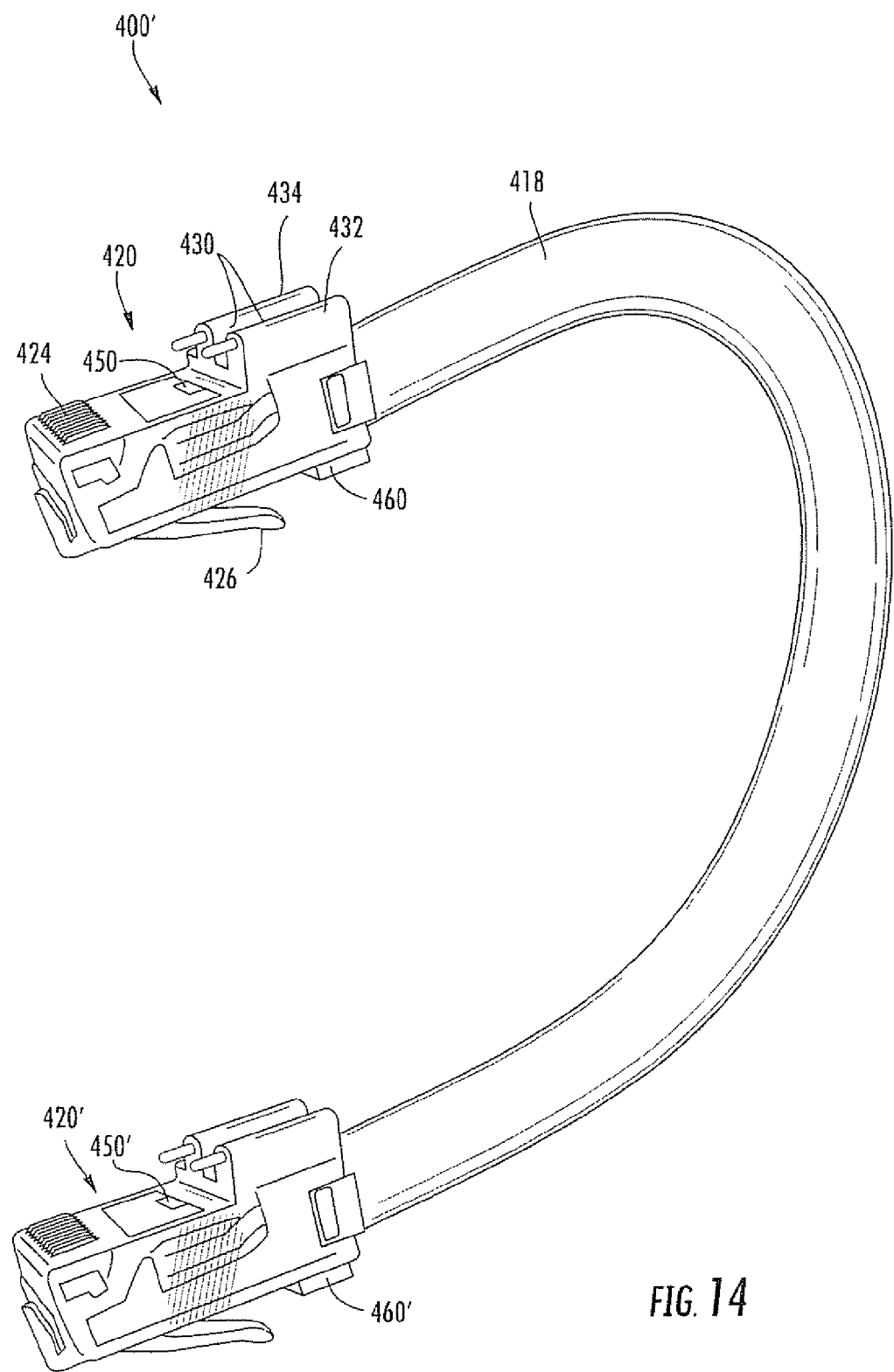
FIG. 14 is a perspective view of a patch cord according to further embodiments of the present invention.

FIG. 14 depicts a patch cord 400' according to still further embodiments of the present invention. The patch cord 400' may be identical to the patch cord 400 of FIGS. 6A and 6B, except that (i) the patch cord 400' includes the LEDs 450, 450' discussed above and (ii) the patch cord 400' further includes one or more built in trace buttons 460, 460'. When an operator presses one of the trace buttons 460, 460', a power signal is delivered to the LEDs 450, 450' over one or both of the control channel conductors 409, 410. This power signal may be provided, for example, from the microprocessor 380 on a printed circuit board 330 of a patch panel 300 that the patch cord 400' is plugged into. The power signal may be provided to the patch cord 400' through the pair of contact pads associated with the connector port 320 of patch panel 300 that the patch cord 400' is plugged into. The LEDs 450, 450' may be designed so that they are powered on in response to a different voltage than is used to power the serial ID chips on any passive labels that the patch cord 400' is used within. Thus, the trace buttons 460, 460' may be used in the above-described fashion to light the LEDs contained in the plugs on either end of the patch cord 400', thus allowing an operator to easily ascertain the location of the far end of the patch cord 400'.

As discussed above, in some embodiments, the system may be designed so that activation of one of the trace buttons 350 that are provided on the patch panel 300 may cause a signal to be sent over the control channel on the patch cord 400 that is plugged into the connector port 320 associated with the trace button 350 to discover/verify the unique identifier of any serial ID chip associated with the connector port that the other end of the patch cord 400 is plugged into. In a similar fashion, activation of, for example, trace button 460 or 460' on the patch cord 400' may likewise cause a signal to be sent over the control channel on the patch cord 400' that is used to discover/verify the unique identifier of any serial ID chip associated with the connector port that the other end of the patch cord 400' is plugged into in, for example, the manner described above with respect to blocks 755 to 765 of FIG. 10.

Figure 12:
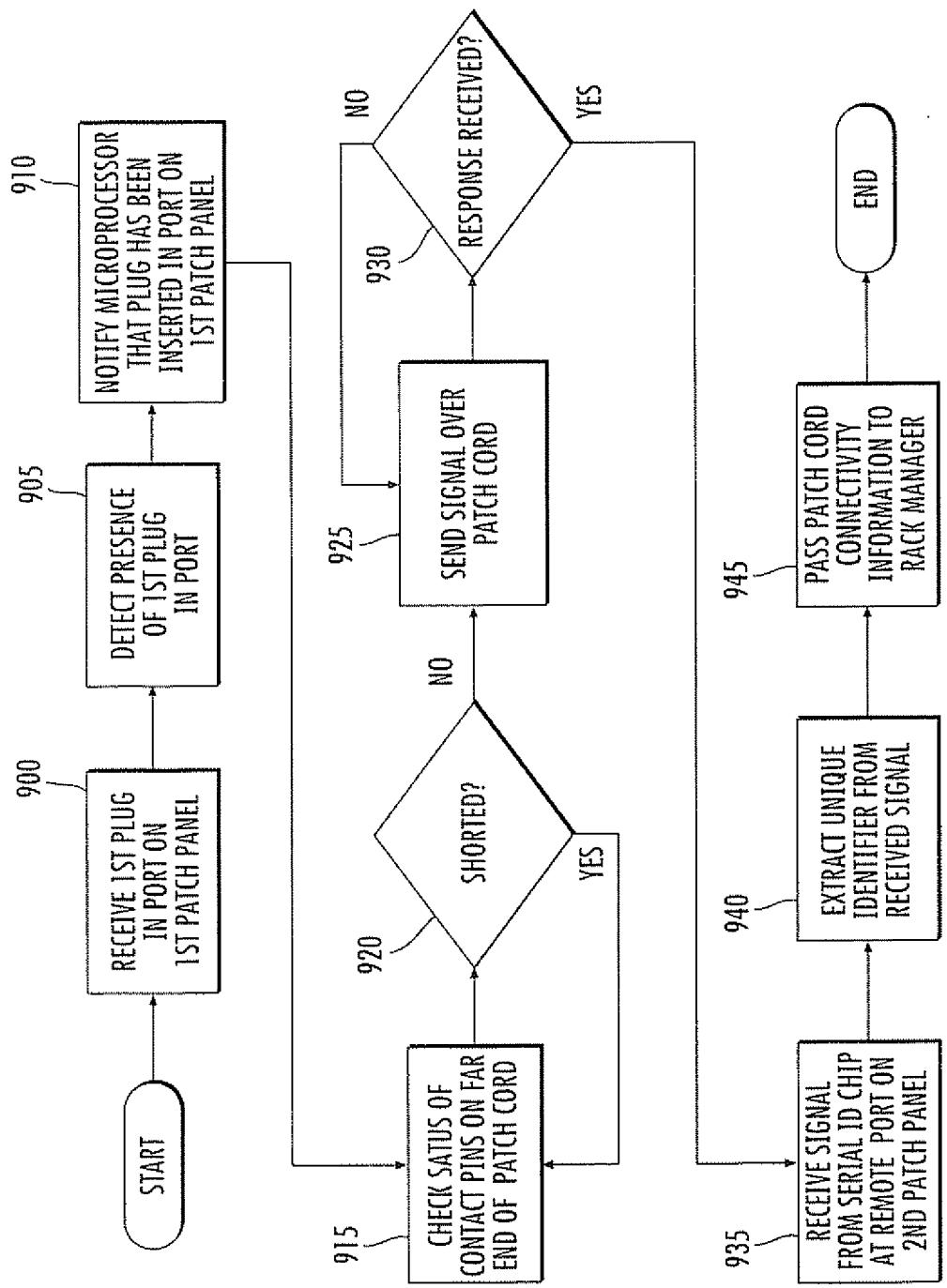
FIG. 12 is a flow chart that illustrates methods according to further embodiments of the present invention for automatically tracking a patching connection between an intelligent patch panel and a network device.

According to still further embodiments of the present invention, the two contact pins 432, 434 for the separate control channel that are provided on each plug 420 of the patch cord 400 may be designed so that the contact pins are short-circuited when the contact pins are not engaging the front face of a patch panel or network device. For example, the plug 400 described above with reference to FIGS. 6A and 6B may be designed so that the contact pins 432 and 434 are short-circuited when the contact pins 432, 434 are in their fully-extended positions. However, when the plug 420 is inserted into a connector port so that contact pins 432 and 434 are driven rearwardly, the short circuit between contact pins 432 and 434 may be broken. This selective short circuit may be implemented, for example, using a simple mechanical switch. Moreover, the microprocessor 380 on the patch panels 300 may be configured to sense whether or not the contacts 432, 434 are short-circuited. FIG. 12 is a flow chart that illustrates methods according to further embodiments of the present invention of automatically tracking a patching connection between an intelligent patch panel and a network device. The method illustrated in FIG. 12 may be used, for example, when a plug 400 having plugs 420 with contact pins 432, 434 that are designed to be short-circuited when the plug is not plugged in is used to provide a patching connection between a connector port 320 of the intelligent patch panel 300 and a connector port on a network device that includes a label 600.

As shown in FIG. 12, operations may begin with a technician inserting the plug 420 of patch cord 400 into one of the connector ports 320 of patch panel 300 (block 900). The intelligent patch panel 300 detects the presence of the plug 420 in the connector port 320 (block 905). This detection may be accomplished, for example, by the sensor 340 that is associated with the connector port 320 that receives the plug 420. An output of the sensor 340 may be provided to the microprocessor 380 (block 910). Upon receiving this sensor output, the microprocessor 380 may check the status of the contact pins 432, 434 on the plug 420 on the remote end of the patch cord 400 (block 915). This may be accomplished, for example, by sending a signal over conductor 409 and sensing whether that signal returns over conductor 410 of the patch cord 400. If at block 920 the microprocessor determines that the contacts 432, 434 are short-circuited, operations return to block 915 and the status check of block 915 may be periodically re-performed. If, on the other hand, at block 920 it is determined that the contacts 432, 434 are no longer short-circuited, then operations proceed to block 925 where a signal is transmitted over the control channel (i.e., the ninth and tenth wires 409, 410) on the patch cord 400.

Next, the microprocessor 380 monitors for a response to the signal (block 930). Once a response is received (block 935), the microprocessor 380 extracts the unique identifier associated with the connector port on the network device that the patch cord 400 is plugged into (block 940). The microprocessor 380 may then pass the patch cord connectivity information (i.e., the unique identifiers for the two connector ports that the patch cord 400 is plugged into) to the rack manager 220, where that information may be logged in a table or database of patching connections.

While the printed circuit board 330 in patch panel 300 includes infrared detectors 340 and infrared emitters 342, it will be appreciated that, in other embodiments of the present invention, these components may be omitted. In such embodiments, the microprocessor 380 may periodically send a signal to all of the connector ports 320 for transmission over the control channel of any patch cords that are plugged into the connector ports 320. Thus, pursuant to such embodiments, the design of the printed circuit board 330 of patch panel 300 may be simplified, but at the expense of additional signalling that is used to periodically send a signal to every connector port 320 that is then transmitted over any patch cord that is plugged into the connector port to determine the connector ports that the far end of any such patch cords are plugged into.

As discussed above, the system may be designed so that the discovery or verification of the unique identifier on the serial ID chip may be triggered in a number of different ways, including (1) the detection that a patch cord has been plugged into a connector port, (2) the activation of a trace button on the patch panel and/or (3) the activation of a trace button on a patch cord. Pursuant to still further embodiments of the present invention, the discovery/verification of the unique identifier on the serial ID chip may be triggered in one or more of several additional ways. For example, in some embodiments, a system controller such as, for example, a rack controller that controls the microprocessors on all of the patch panels and other equipment mounted on a particular equipment rack could perform routine status checks that are used to verify the accuracy of the stored connectivity data by serially sending control signals over each patch cord that is plugged into connector ports on the patch panels and/or other equipment that is mounted on the equipment rack. In still other embodiments, system management software that is, for example, used to control rack managers in the system and/or microprocessors such as the microprocessors 380 on the patch panels 300 could be set up to run periodic checks in order to verify the accuracy of the stored connectivity data by serially sending control signals over the patch cords that are plugged into patch panels and/or network equipment that include the functionality according to embodiments of the present invention. In still further embodiments, the system could be designed so that control signals are sent over a patch cord as part of an electronic work order process in order to verify/validate that a patch cord that was plugged into (or removed from) a connector port in response to an electronic work order was plugged into the correct connector port or that the correct patch cord end was removed. In yet additional embodiments, the system could be designed so that control signals are sent over a patch cord to discover/verify the unique identifier on any serial ID chip that the other end of the patch cord is plugged into upon receipt of a link up/down SNMP trap from a network switch. Thus, it will be appreciated that a wide variety of mechanism may be used to trigger the functionality of the intelligent patch panels, patch cords and labels according to embodiments of the present invention.

It should also be noted that while the printed circuit board 330 of patch panel 300 includes a plurality of serial ID chips 370, pursuant to other embodiments of the present invention, the serial ID chips 370 may be omitted. When the serial ID chips 370 are omitted, the patch panel 300 loses the ability to transmit a unique identifier for each connector port to other patch panels. However, removal of the serial ID chips also simplifies the design and reduces the cost of the patch panels 300. Moreover, as the patch panels 300 already have the sensors 340 that allow for automatically tracking patching connections using the "logical inference" techniques discussed above, removal of the serial ID chips 370 does not result in a loss of the ability to track patching connections.

Figure 13:
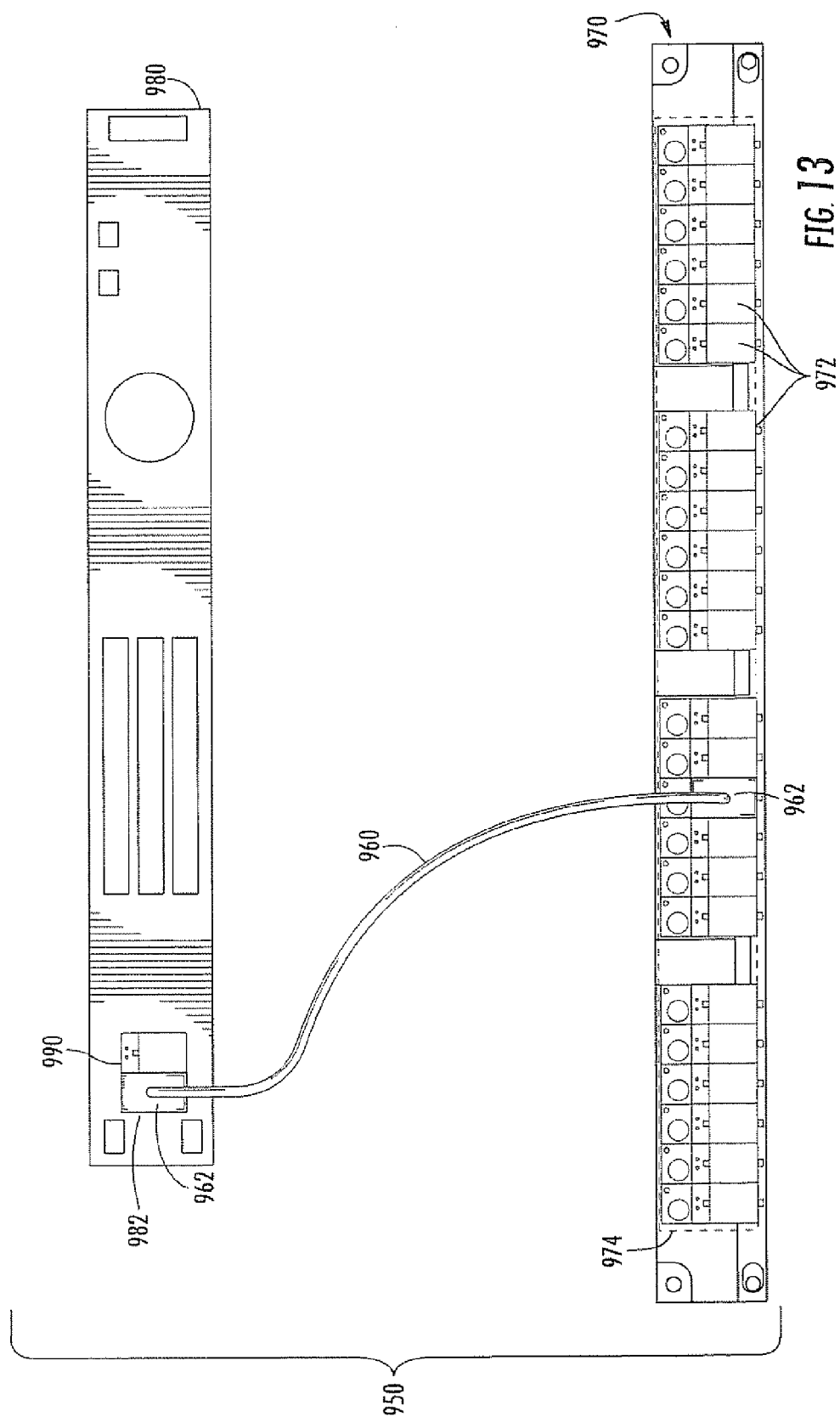
FIG. 13 illustrates a communications patching system according to further embodiments of the present invention.

While embodiments of the present invention have been primarily described above with respect to copper patch panels and patch cords that use twisted wire pairs for the data channel(s), it will be appreciated that according to further embodiments of the present invention, the same techniques may be applied with respect to fiber optic patch panels, network devices and patch cords. FIG. 13 illustrates a communications patching system 950 in which a fiber optic patch cord 960 that is terminated with duplex LC connectors 962 is used to create a patching connection between an LC fiber optic adapter 972 on a fiber optic patch panel 970 and an LC fiber optic adapter 982 on a network device 980. A label 990 according to embodiments of the present invention is attached to the network device 980 directly above the fiber optic adapters 982.

As shown in FIG. 13, the patch panel 970 may have essentially the same design as the patch panel 300 of FIGS. 4 and 5, except that the RJ-45 connector ports 320 of the patch panel 300 are replaced with the fiber optic adapter connector ports 982. In particular, the printed circuit board 974 on the patch panel 970 may be essentially identical to the printed circuit board 330 of patch panel 300. Likewise, the label 990 may be essentially identical to the label 600 of FIG. 8. As such, the printed circuit board 974 and the label 990 will not be described further herein, and it will be understood that they contain the features of printed circuit board 330 and label 600, respectively, modified appropriately based on the change from RJ-45 connector ports to LC fiber optic adapters. The patch cord 960 may be similar to the patch cord 400 of FIGS. 6A and 6B. However, in the patch cord 960, the data communications channel comprises a cable 918 that contains a pair of optical fibers as opposed to the four differential pairs of conductors that form the data communications channel in the patch cord 400. Also, the separator 415 of patch cord 400 may be omitted in the patch cord 960. The RJ-45 style modular plugs 420 of the patch cord 400 are replaced with the duplex LC connectors 962. The duplex connectors 962 may be any standard duplex LC connector, which is modified to include a pair of contacts (not visible in FIG. 13) that mate with the contact pads (or other contacts) that are positioned adjacent the connector ports on the patch panel 970 and on the label 990. Thus, as illustrated with respect to FIG. 13, the methods, systems, patch cords and labels according to embodiments of the present invention may be implemented in both copper-based communications patching systems such as RJ-11 and RJ-45 systems as well as in fiber optic communications patching systems.

Communications patching systems according to embodiments of the present invention may offer a number of advantages over prior art systems. As noted above, passive labels may be applied to network switches so as to allow for automatic tracking of patching connections in inter-connect communications patching systems. These labels may be easy to install and may be relatively small, thereby supporting high connector port density on the switches. Moreover, passive labels may also be provided for servers, routers and other network devices, thereby allowing automatic tracking of patching connectivity to these types of devices as well.

Additionally, while the serial ID chip tracking features according to embodiments of the present invention require the use of a special patch cord that includes ninth and tenth wires, the patch panels according to embodiments of the present invention may work equally well with standard patch cords—they just will not have the serial ID chip tracking capabilities when such standard patch cords are used. The same is true with respect to switches, servers, routers and other network devices that have passive labels according to embodiments of the present invention mounted thereon. Moreover, as discussed above, the methods and systems described herein may be implemented on both fiber optic devices (i.e., fiber optic patch panels, patch cords, switches, etc.) and on copper devices.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of automatically tracking a patching connection between a first connector port of a patch panel and a second connector port of a network device, the method comprising:

detecting, via a sensor, that a first plug of a patch cord has been inserted into the first connector port, the patch cord having at least one data communications channel and a separate control channel;

biasing a first conductor of the control channel of the patch cord to power an integrated circuit chip that is pre-programmed with a unique identifier that identifies the second connector port, wherein the integrated circuit chip is fixedly mounted on a front face of the network device either above or below a plug receiving opening into the second connector port;

transmitting a first signal through the first plug, over the control channel of the patch cord onto, through and out of a second plug of the patch cord to the integrated circuit chip in response to detecting that the first end of the patch cord has been inserted into the first connector port;

receiving a second signal that is transmitted by the integrated circuit chip and that is carried over the control channel of the patch cord in response to the first signal, the second signal including the unique identifier.

2. The method of claim 1, wherein the integrated circuit chip comprises a serial ID chip that is mounted on a printed circuit board that is part of a passive label that is fixedly adhesively attached either above or below a plug aperture of the second connector port on the network device.

3. The method of claim 1, wherein the second plug of the patch cord includes a pair of contacts that are each moveable between a fully extended position and a retracted position and are further configured so that the pair of contacts are short-circuited when each of the pair of contacts are in their fully-extended position, the method further comprising determining that the pair of contacts are not short-circuited prior to transmitting the first signal over the control channel of the patch cord to the network device.

4. The method of claim 2, wherein the network device comprises a network switch, a network router, a network server, a mainframe computer, a network storage device, a blade server, an uninterruptable power supply, a managed power distribution unit or a private branch exchange.

5. The method of claim 1, wherein the at least one data communications channel of the patch cord comprises at least one optical fiber, and wherein the control channel comprises a pair of conductors.

6. A passive electronically readable label that is configured to be installed on a network device that includes a connector port, the label comprising:
a printed circuit board;
an integrated circuit chip mounted on the printed circuit board that is pre-programmed with a unique identifier that identifies the connector port;
a pair of contacts mounted on the printed circuit board either above or below an opening into a plug aperture of the connector port, the pair of contacts configured to selectively make electrical contact with respective ones of a pair of plug contacts on a communications plug when the communications plug is received within the connector port;
a light emitting diode that is associated with the connector port on the printed circuit board, the light emitting diode being configured to be powered through the pair of contacts; and
an adhesive that is used to mount the printed circuit board to a front face of the network device,
wherein at least a first contact of the pair of contacts is electrically connected to the integrated circuit chip via a conductive path on the printed circuit board; and wherein the printed circuit board is electrically isolated from the network device.

7. The passive electronically readable label of claim 6, wherein the integrated circuit chip comprises a serial ID chip.

8. The passive electronically readable label of claim 7, wherein a second contact of the pair of contacts is electrically connected to a grounded conductor on the printed circuit board.

9. The passive electronically readable label of claim 7, wherein the printed circuit board comprises a double-sided printed circuit board, and wherein the pair of contacts are mounted on a front side of the printed circuit board and the serial ID chip is mounted on the back side of the printed circuit board.

10. The passive electronically readable label of claim 7, wherein the adhesive comprises an adhesive layer on the back side of the printed circuit board, and wherein the adhesive layer includes an opening that receives the serial ID chip.

11. The passive electronically readable label of claim 8, wherein the first contact comprises a first contact pad on the printed circuit board and the second contact comprises a second contact pad on the printed circuit board.

12. The passive electronically readable label of claim 7, wherein the network device comprises a network switch having a plurality of additional connector ports, wherein a plurality of additional pairs of contacts are mounted on the printed circuit board either above or below respective ones of the plurality of additional connector ports, wherein a plurality of additional serial ID chips, each having a unique identifier, are mounted on the printed circuit board and associated with respective ones of the plurality of additional connector ports, and wherein a first contact of each of the plurality of additional pairs of contacts are electrically connected to respective ones of the plurality of additional serial ID chips.

13. The passive electronically readable label of claim 12, further comprising a plurality of additional light emitting diodes on the printed circuit board, where each of the plurality of additional light emitting diodes is associated with a respective one of the plurality of additional connector ports.

14. The passive electronically readable label of claim 13, wherein each light emitting diode is configured to be turned on in response to activation of a respective trace button.

15. The passive electronically readable label of claim 7, wherein the serial ID chip is powered by a first voltage received through the first contact, wherein the light emitting diode is powered by a second voltage received through the first contact, wherein the second voltage is different than the first voltage.

16. A system for automatically tracking patch cord connectivity in a communications patching system, comprising:
a patch panel having a local connector port and a local printed circuit board that includes a local pair of contacts mounted adjacent the local connector port;
a passive electronically readable label that is mounted either above or below a plug aperture of a remote connector port on a network device, the passive electronically readable label including a remote integrated circuit chip mounted on a remote printed circuit board and preprogrammed with a unique identifier that identifies the remote connector port, the remote printed circuit board having a remote pair of contacts mounted thereon adjacent the remote connector port;
a patch cord having a data communications channel for carrying network communications, a separate control channel that comprises first and second insulated conductors, a local plug that includes first and second plug contacts and a remote plug that includes third and fourth plug contacts, wherein the first and second plug contacts mate with the respective contacts of the local pair of contacts to electrically connect the first and second insulated conductors to the local printed circuit board when the local plug is inserted into the local connector port, and wherein the third and fourth plug contacts mate with the respective contacts of the remote pair of contacts to electrically connect the first and second insulated conductors to the remote printed circuit board when the remote plug is inserted into the remote connector port;

wherein the patch panel further includes a sensor that is configured to detect when an end of the patch cord is inserted into the connector port and to forward a signal to the remote integrated circuit chip in response to sensing that the end of the patch cord was inserted into the connector port, and wherein plugging the remote plug into the remote connector port removes a short circuit between the third and fourth plug contacts.

17. The system for automatically tracking patch cord connectivity in a communications patching system of claim 16, wherein the remote integrated circuit chip comprises a remote serial ID chip, the system further comprising a local integrated circuit chip that is in communication with the local pair of contacts, the local integrated circuit chip configured to transmit a first signal through the local pair of contacts, over the control channel on the patch cord, through the remote pair of contacts to the remote serial ID chip.

18. The system for automatically tracking patch cord connectivity in a communications patching system of claim 17, wherein the first signal is configured to cause the serial ID chip to send a responsive second signal that includes the unique identifier of the serial ID chip to the local integrated circuit chip.

19. The system for automatically tracking patch cord connectivity in a communications patching system of claim 18, wherein the serial ID chip is configured to draw its operating voltage from the patch cord.

20. The method of claim 1, wherein detecting, via a sensor, that a first plug of the patch cord has been inserted into the first connector port comprises sensing the physical presence of a structure within a plug aperture of the first connector port.

21. The passive electronically readable label of claim 6, wherein the passive electronically readable label comprises a substrate that is attached to a front face of the network device.

22. The passive electronically readable label of claim 21, wherein the passive electronically readable label is placed below the connector port and above a second connector port, and wherein the passive electronically readable label further includes a second pair of contacts mounted on the printed circuit board that are associated with a second integrated circuit chip that has a unique identifier for the second connector port stored therein.

23. The method of claim 1, wherein the second plug includes a first spring-loaded pogo-style contact that is electrically connected to the first conductor of the control channel.

* * * * *